(12) United States Patent
Mehra

(10) Patent No.: US 8,836,777 B2
(45) Date of Patent: Sep. 16, 2014

(54) AUTOMATIC DETECTION OF VERTICAL GAZE USING AN EMBEDDED IMAGING DEVICE

(75) Inventor: Sumat Mehra, San Jose, CA (US)

(73) Assignee: DigitalOptics Corporation Europe Limited, Ballybrit, Galway (IE)

( * ) Notice: Subject to any disclaimer, the term of this patent is extended or adjusted under 35 U.S.C. 154(b) by 50 days.

(21) Appl. No.: 13/035,907

(22) Filed: Feb. 25, 2011

(65) Prior Publication Data

US 2012/0218398 A1 Aug. 30, 2012

(51) Int. Cl.
| | |
|---|---|
| H04N 9/47 | (2006.01) |
| G06K 9/46 | (2006.01) |
| G09G 5/00 | (2006.01) |
| G06F 3/01 | (2006.01) |
| G06K 9/00 | (2006.01) |

(52) U.S. Cl.
CPC ............ *G06F 3/013* (2013.01); *G06K 9/00597* (2013.01); *G06K 9/00335* (2013.01)
USPC ................... 348/78; 348/48; 382/195; 345/7

(58) Field of Classification Search
USPC ................................................ 348/78; 345/7
See application file for complete search history.

(56) References Cited

U.S. PATENT DOCUMENTS

| | | | |
|---|---|---|---|
| 4,047,187 A | 9/1977 | Mashimo et al. | |
| 4,317,991 A | 3/1982 | Stauffer | |
| 4,367,027 A | 1/1983 | Stauffer | |
| RE31,370 E | 9/1983 | Mashimo et al. | |
| 4,638,364 A | 1/1987 | Hiramatsu | |
| RE33,682 E | 9/1991 | Hiramatsu | |
| 5,164,992 A | 11/1992 | Turk et al. | |
| 5,291,234 A | 3/1994 | Shindo et al. | |
| 5,488,429 A | 1/1996 | Kojima et al. | |
| 5,572,596 A | 11/1996 | Wildes et al. | |
| 5,638,136 A | 6/1997 | Kojima et al. | |
| 5,710,833 A | 1/1998 | Moghaddam et al. | |
| 5,724,456 A | 3/1998 | Boyack et al. | |

(Continued)

FOREIGN PATENT DOCUMENTS

| | | |
|---|---|---|
| EP | 1748378 A1 | 1/2007 |
| GB | 2370438 A | 6/2002 |

(Continued)

OTHER PUBLICATIONS

Zhiwei Zhu "Eye and Gaze Tracking for Interactive Graphic Display" Machine Vision & Applications; Jul. 2004, vol. 15 Issue 3, p. 139-148.*

(Continued)

*Primary Examiner* — Andy S. Rao
*Assistant Examiner* — Tsion B Owens
(74) *Attorney, Agent, or Firm* — Hickman Palermo Truong Becker Bingham Wong LLP

(57) ABSTRACT

A method of detecting and applying a vertical gaze direction of a face within a digital image includes analyzing one or both eyes of a face within an acquired image, including determining a degree of coverage of an eye ball by an eye lid within the digital image. Based on the determined degree of coverage of the eye ball by the eye lid, an approximate direction of vertical eye gaze is determined. A further action is selected based on the determined approximate direction of vertical eye gaze.

36 Claims, 21 Drawing Sheets

(56) References Cited

U.S. PATENT DOCUMENTS

| | | |
|---|---|---|
| 5,774,591 A | 6/1998 | Black et al. |
| 5,781,650 A | 7/1998 | Lobo et al. |
| 5,802,220 A | 9/1998 | Black et al. |
| 5,812,193 A | 9/1998 | Tomitaka et al. |
| 5,818,975 A | 10/1998 | Goodwin et al. |
| 5,835,616 A | 11/1998 | Lobo et al. |
| 5,870,138 A | 2/1999 | Smith et al. |
| 5,978,519 A | 11/1999 | Bollman et al. |
| 5,991,456 A | 11/1999 | Rahman et al. |
| 6,097,470 A | 8/2000 | Buhr et al. |
| 6,101,271 A | 8/2000 | Yamashita et al. |
| 6,128,397 A | 10/2000 | Baluja et al. |
| 6,148,092 A | 11/2000 | Qian |
| 6,151,073 A | 11/2000 | Steinberg et al. |
| 6,188,777 B1 | 2/2001 | Darrell et al. |
| 6,192,149 B1 | 2/2001 | Eschbach et al. |
| 6,249,315 B1 | 6/2001 | Holm |
| 6,263,113 B1 | 7/2001 | Abdel-Mottaleb et al. |
| 6,268,939 B1 | 7/2001 | Klassen et al. |
| 6,282,317 B1 | 8/2001 | Luo et al. |
| 6,301,370 B1 | 10/2001 | Steffens et al. |
| 6,301,440 B1 | 10/2001 | Bolle et al. |
| 6,332,033 B1 | 12/2001 | Qian |
| 6,393,148 B1 | 5/2002 | Bhaskar |
| 6,404,900 B1 | 6/2002 | Qian et al. |
| 6,407,777 B1 | 6/2002 | DeLuca |
| 6,421,468 B1 | 7/2002 | Ratnakar et al. |
| 6,438,264 B1 | 8/2002 | Gallagher et al. |
| 6,456,732 B1 | 9/2002 | Kimbell et al. |
| 6,459,436 B1 | 10/2002 | Kumada et al. |
| 6,473,199 B1 | 10/2002 | Gilman et al. |
| 6,501,857 B1 | 12/2002 | Gotsman et al. |
| 6,504,942 B1 | 1/2003 | Hong et al. |
| 6,504,951 B1 | 1/2003 | Luo et al. |
| 6,516,154 B1 | 2/2003 | Parulski et al. |
| 6,526,161 B1 | 2/2003 | Yan |
| 6,606,397 B1 | 8/2003 | Yamamoto |
| 6,965,684 B2 | 11/2005 | Chen et al. |
| 7,035,440 B2 | 4/2006 | Kaku |
| 7,233,684 B2 | 6/2007 | Fedorovskaya et al. |
| 7,315,631 B1 | 1/2008 | Corcoran et al. |
| 7,317,815 B2 | 1/2008 | Steinberg et al. |
| 7,551,754 B2 | 6/2009 | Steinberg et al. |
| 7,551,755 B1 | 6/2009 | Steinberg et al. |
| 7,715,597 B2 | 5/2010 | Costache et al. |
| 7,738,015 B2 | 6/2010 | Steinberg et al. |
| 7,792,335 B2 | 9/2010 | Steinberg et al. |
| 7,804,983 B2 | 9/2010 | Steinberg et al. |
| 7,916,971 B2 | 3/2011 | Bigioi et al. |
| 7,995,795 B2 | 8/2011 | Steinberg et al. |
| 8,005,268 B2 | 8/2011 | Steinberg et al. |
| 8,441,343 B1 | 5/2013 | Fishman |
| 2001/0028731 A1 | 10/2001 | Covell et al. |
| 2001/0031142 A1 | 10/2001 | Whiteside |
| 2001/0040987 A1 | 11/2001 | Bjorn et al. |
| 2002/0105482 A1* | 8/2002 | Lemelson et al. ............ 345/7 |
| 2002/0105662 A1 | 8/2002 | Patton et al. |
| 2002/0114535 A1 | 8/2002 | Luo |
| 2002/0172419 A1 | 11/2002 | Lin et al. |
| 2003/0025812 A1 | 2/2003 | Slatter |
| 2003/0052991 A1 | 3/2003 | Stavely et al. |
| 2003/0071908 A1 | 4/2003 | Sannoh et al. |
| 2003/0160879 A1 | 8/2003 | Robins et al. |
| 2003/0169906 A1 | 9/2003 | Gokturk et al. |
| 2003/0190090 A1 | 10/2003 | Beeman et al. |
| 2004/0001616 A1 | 1/2004 | Gutta et al. |
| 2004/0088272 A1 | 5/2004 | Jojic et al. |
| 2004/0104864 A1 | 6/2004 | Nakada |
| 2004/0170397 A1 | 9/2004 | Ono |
| 2004/0175020 A1 | 9/2004 | Bradski et al. |
| 2004/0183828 A1 | 9/2004 | Nichogi et al. |
| 2004/0197013 A1 | 10/2004 | Kamei |
| 2004/0223629 A1 | 11/2004 | Chang |
| 2005/0018925 A1 | 1/2005 | Bhagavatula et al. |
| 2005/0102246 A1 | 5/2005 | Movellan et al. |
| 2006/0204106 A1 | 9/2006 | Yamaguchi |
| 2007/0250853 A1 | 10/2007 | Jain et al. |
| 2008/0025576 A1 | 1/2008 | Li et al. |
| 2008/0111819 A1 | 5/2008 | Sung et al. |
| 2008/0205712 A1 | 8/2008 | Ionita et al. |
| 2008/0292193 A1 | 11/2008 | Bigioi et al. |
| 2008/0310759 A1 | 12/2008 | Liu et al. |
| 2009/0109400 A1 | 4/2009 | Yoshinaga et al. |
| 2009/0141951 A1 | 6/2009 | Ogo et al. |
| 2009/0189998 A1 | 7/2009 | Nanu et al. |
| 2009/0190803 A1 | 7/2009 | Neghina et al. |
| 2010/0020970 A1 | 1/2010 | Liu et al. |
| 2010/0033112 A1 | 2/2010 | Yen |
| 2010/0125799 A1* | 5/2010 | Roberts et al. ............ 715/757 |
| 2010/0202707 A1 | 8/2010 | Costache et al. |
| 2010/0209074 A1 | 8/2010 | Kondo et al. |
| 2010/0321321 A1 | 12/2010 | Shenfield et al. |
| 2011/0058058 A1 | 3/2011 | Steinberg et al. |
| 2011/0069277 A1* | 3/2011 | Blixt et al. ............ 351/210 |
| 2011/0102553 A1 | 5/2011 | Corcoran et al. |
| 2011/0234847 A1 | 9/2011 | Bigioi et al. |
| 2011/0235912 A1 | 9/2011 | Bigioi et al. |
| 2011/0237324 A1 | 9/2011 | Clavin et al. |
| 2011/0273546 A1 | 11/2011 | Lin et al. |
| 2011/0275939 A1 | 11/2011 | Walsh et al. |
| 2011/0279700 A1 | 11/2011 | Steinberg et al. |
| 2011/0280446 A1 | 11/2011 | Steinberg et al. |
| 2011/0300831 A1 | 12/2011 | Chin |
| 2012/0013476 A1 | 1/2012 | Dove |
| 2012/0027267 A1 | 2/2012 | Kim et al. |
| 2012/0172085 A1 | 7/2012 | Vuppu et al. |
| 2012/0194550 A1 | 8/2012 | Osterhout et al. |
| 2012/0206340 A1 | 8/2012 | Mori et al. |
| 2012/0242656 A1 | 9/2012 | McArdle et al. |
| 2012/0287035 A1 | 11/2012 | Valko et al. |
| 2012/0314899 A1 | 12/2012 | Cohen et al. |
| 2013/0009868 A1 | 1/2013 | Sako et al. |
| 2013/0009910 A1 | 1/2013 | Takano |
| 2013/0033485 A1 | 2/2013 | Kollin et al. |
| 2013/0044055 A1 | 2/2013 | Karmarkar et al. |
| 2013/0214998 A1 | 8/2013 | Andes et al. |
| 2013/0265227 A1 | 10/2013 | Julian |
| 2013/0321271 A1 | 12/2013 | Bychkov et al. |
| 2014/0132508 A1 | 5/2014 | Hodge et al. |

FOREIGN PATENT DOCUMENTS

| | | |
|---|---|---|
| JP | 5260360 A2 | 10/1993 |
| JP | 2002199202 A | 7/2002 |
| JP | 2005003852 A | 1/2005 |
| WO | WO2007060980 A1 | 5/2007 |
| WO | 2007/097777 A2 | 8/2007 |
| WO | WO2009095168 A1 | 8/2009 |

OTHER PUBLICATIONS

Luigi Di Stefano, Massimiliano Marchionni, and Stefano Mattoccia, A fast area-based stereo matching algorithm, Image and Vision Computing, 22 (2004) pp. 983-1005.

Jing Xiao, Simon Baker, Iain Matthews, and Takeo Kanade, Real-Time Combined 2D+3D Active Appearance Models, in Proceedings of the IEEE Conference on Computer Vision and Pattern Recognition (CVPR'04), pp. 535-542, 2004.

Changbo Hu, Jing Xiao, Iain Matthews, Simon Baker, Jeff Cohn, and Takeo Kanade, Fitting a Single Active Appearance Model Simultaneously to Multiple Images, in Proc. of the British Machine Vision Conference, Sep. 2004.

Seth C. Koterba, Simon Baker, Iain Matthews, Changbo Hu, Jing Xiao, Jeffrey Cohn, and Takeo Kanade, Multi-View AAM Fitting and Camera Calibration, In Proc. International Conference on Computer Vision, Oct. 2005, pp. 511-518.

Volker Blanz and Thomas Vetter, A Morphable Model for the Synthesis of 3D Faces, in Proceedings of the 26th annual conference on Computer graphics and interactive techniques, pp. 187-194, 1999.

Karsten Mühlmann, Dennis Maier, Jürgen Hesser and Reinhard Männer, Calculating Dense Disparity Maps from Color Stereo Images, an Efficient Implementation, International Journal of Computer Vision, Apr. 2002, vol. 47, Nos. 1-3, pp. 79-88.

(56) References Cited

OTHER PUBLICATIONS

I. Andorko and P. Corcoran, FPGA Based Stereo Imaging System with Applications in Computer Gaming, at International IEEE Consumer Electronics Society's Games Innovations Conference 2009 (ICE-GIC 09), London, UK.
C. Georgoulas, L. Kotoulas, G. CH. Sirakoulis, I. Andreadis, A. Gasteratos, Real-Time Disparity Map Computation Module, Microprocessors and Microsystems 32, pp. 159-170, 2008.
Non-final Rejection, dated Nov. 28, 2011, for U.S. Appl. No. 12/354,707, filed Jan. 15, 2009.
Final Rejection, dated May 22, 2012, for U.S. Appl. No. 12/354,707, filed Jan. 15, 2009.
Yunus Saatci, Christopher Town, "Cascaded Classification of Gender and Facial Expression using Active Appearance Models," Automatic Face and Gesture Recognition, IEEE International Conference on, pp. 393-400, Seventh IEEE International Conference on Automatic Face and Gesture Recognition (FG'06), 2006.
Irene Kotsia, Ioannis Pitas: Facial Expression Recognition in Image Sequences Using Geometric Deformation Features and Support Vector Machines, IEEE Transactions on Image Processing, vol. 16, No. 1, Jan. 1, 2007. pp. 172-187.
T.F. Cootes, G.J. Edwards, and C.J. Taylor: Active Appearance Models, in Proc. European Conference on Computer Vision, 1998, (H. Burkhardt and B. Neumann Eds.), vol. 2, pp. 484-498, Springer, 1998.
Fadi Dornaika, Jorgen Ahlberg: "Fast and Reliable Active Appearance Model Search for 3-D Face Tracking," Proceedings of Mirage 2003, INRIA Rocquencourt, France, Mar. 10-11, 2003, pp. 113-122.
Zhengrong Yao, Haibo Li: Tracking a Detected Face with Dynamic Programming, Proceedings of the 2004 IEEE Computer Society Conference on Computer Vision and Pattern Recognition Workshops (CVPRW'04), 2004, 8 Pages.
Final Office Action mailed Mar. 24, 2010, for U.S. Appl. No. 11/460,225 filed Jul. 26, 2006.
Non-Final Office Action mailed Mar. 25, 2010, for U.S. Appl. No. 11/460,218 filed Jul. 26, 2006.
Non-Final Office Action mailed Sep. 21, 2009, for U.S. Appl. No. 11/460,218 filed Jul. 26, 2006.
Non-Final Office Action mailed Sep. 22, 2009, for U.S. Appl. No. 11/460,225 filed Jul. 26, 2006.
Notice of Allowance mailed Aug. 20, 2010, for U.S. Appl. No. 11/460,225 filed Jul. 26, 2006.
Notice of Allowance mailed Jul. 13, 2010, for U.S. Appl. No. 11/460,225 filed Jul. 26, 2006.
Notice of Allowance mailed Jun. 29, 2010, for U.S. Appl. No. 11/460,218 filed Jul. 26, 2006.
PCT Notification of the Transmittal of the International Search Report and the Written Opinion of the International Searching Authority, or the Declaration, for Application No. PCT/EP2009/000315, dated Apr. 29, 2009, 13 pages.
PCT Notification Concerning Transmittal of International Preliminary Report on Patentability, Chapter I, for PCT Application No. PCT/US2006/030173, dated Sep. 4, 2008, 7 pages.
Yang, Ming-Hsuan et al., Detecting Faces in Images: A Survey, IEEE Transactions on Pattern Analysis and Machine Intelligence, vol. 24—Issue 1, Jan. 1, 2002, pp. 34-58, IEEE Computer Society ISSN:0162-8828, http://portal.acm.org/citation.cfm?id=505621&coll=GUIDE&dl=GUIDE&CFID=680-9268&CFTOKEN=82843223.
Huang W., et al., "Eye Tracking with Statistical Learning and Sequential Monte Carlo Sampling," Proceedings of the Fourth International Conference on Information, Communications & Signal Processing and Fourth IEEE Pacific-Rim Conference on Multimedia (ICICS-PCM2003), 2003, vol. 3, pp. 1873-1878.
Rowley, Henry A. et al., Neural network-based face detection, IEEE Transactions on Pattern Analysis and Machine Intelligence, 1998, pp. 23-38, p. 92, vol. 20—Issue 1. ISSN: 0162-8828, DOI: 10.1109/34.655647, Posted online: Aug. 6, 2002. http://ieeexplore.ieee.org/xpl/freeabs_all.jps?arnumber-655647andisnumber-14286.
Communication pursuant to Article 94(3) EPC, Examination Report for European Patent Application No. 06789329.7, dated Jul. 31, 2009, 5 Pages.
Communication pursuant to Article 94(3) EPC, Examination Report for European patent application No. 06789329.7, dated May 23, 2011, 5 pages.
The extended European search report includes, pursuant to Rule 62 EPC, the supplementary European search report (Art. 153(7) EPC) and the European search opinion, for European application No. 06789329.7, dated Jan. 22, 2009, 7 pages.
The extended European search report includes, pursuant to Rule 62 EPC, the supplementary European search report (Art. 153(7) EPC) and the European search opinion, for European application No. 06800683.2, dated Jun. 29, 2011, 7 pages.

\* cited by examiner

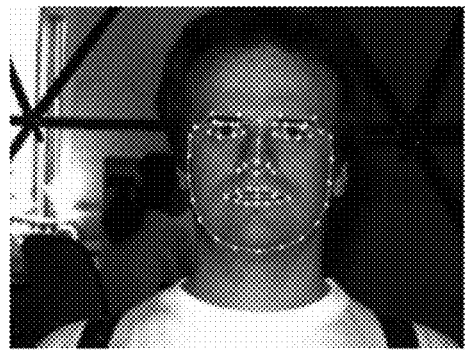
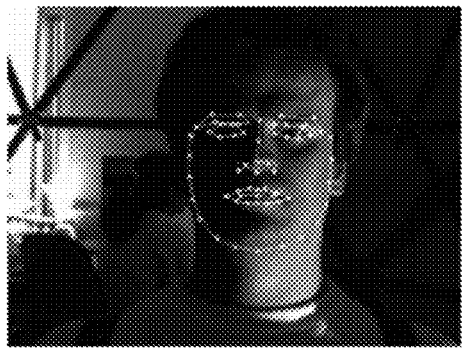
Figure 6A  Figure 6B
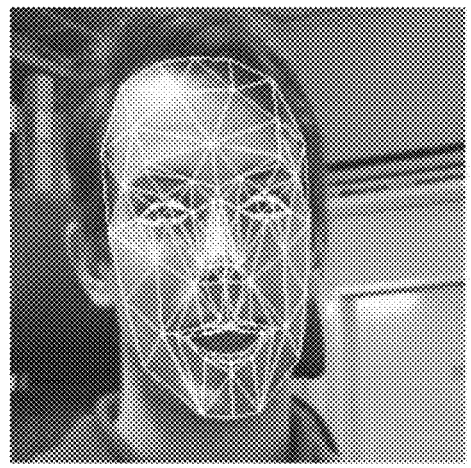
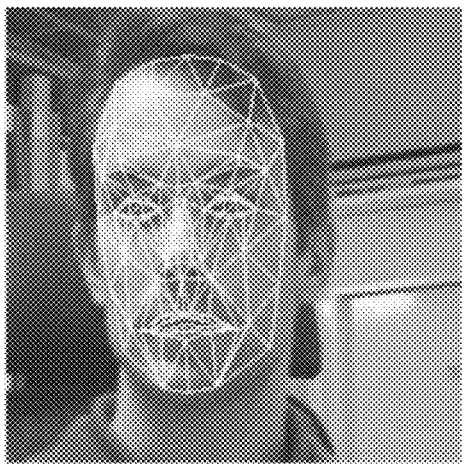
Figure 7A  Figure 7B
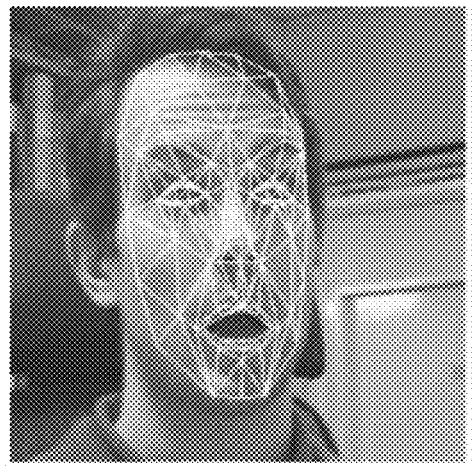
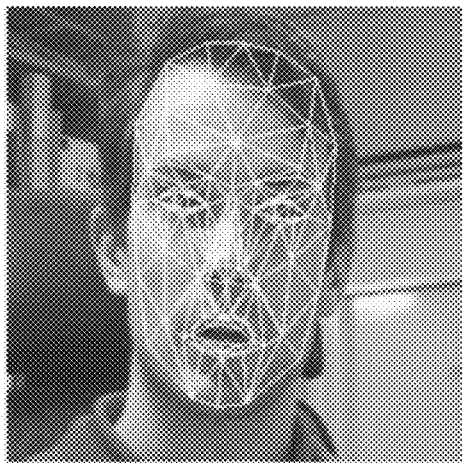
Figure 7C  Figure 7D

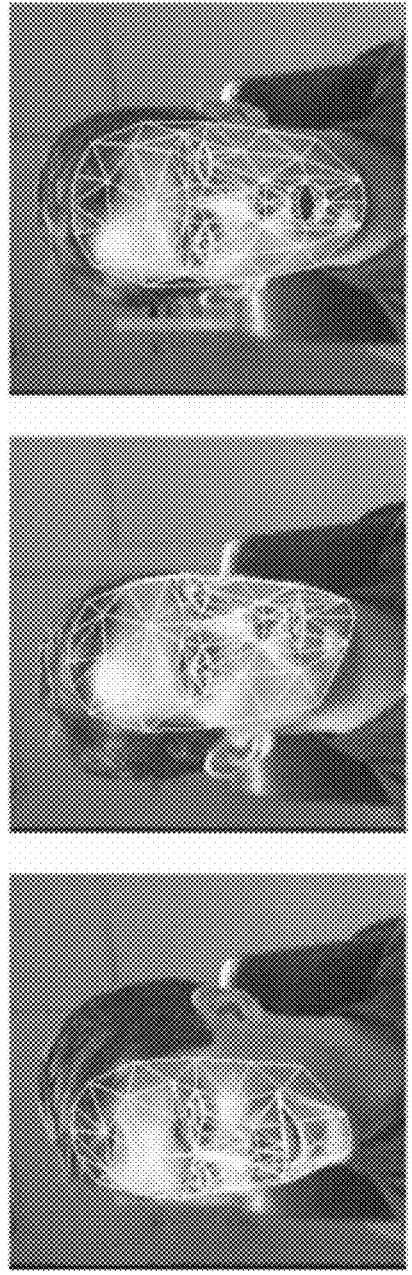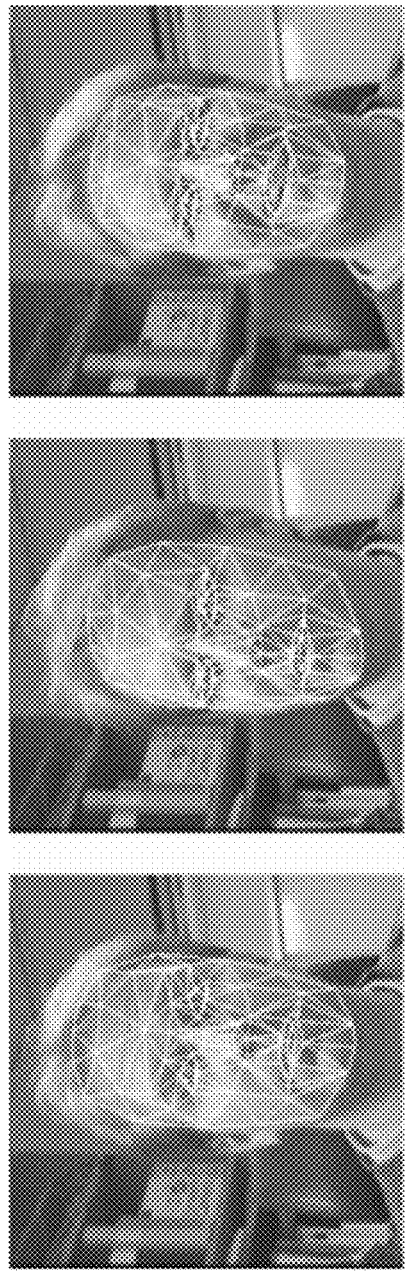

h1>w1 (frontal faces)

h2<w2 (up-down faces)
Note: w1=w2

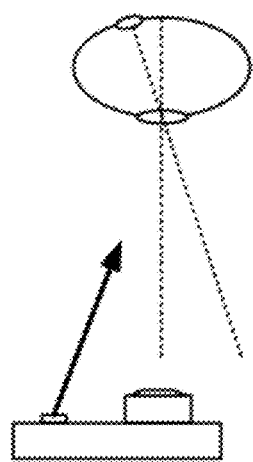 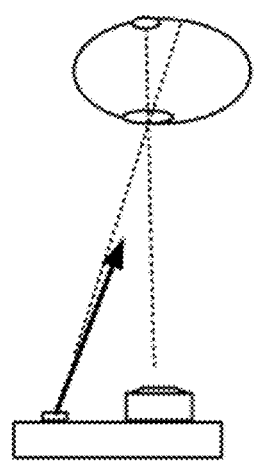 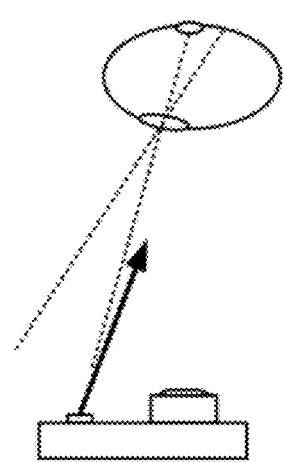
Figure 19A  Figure 19B  Figure 19C
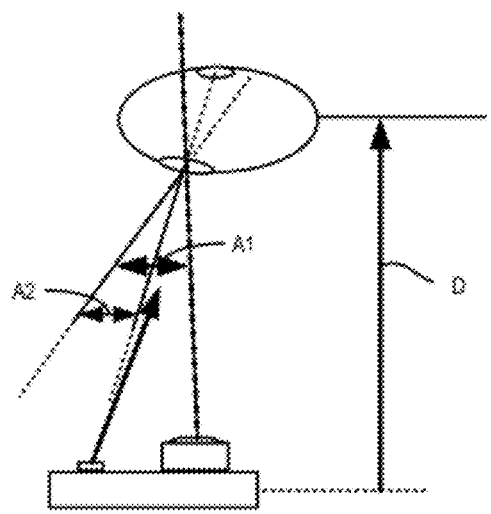
Figure 20

AUTOMATIC DETECTION OF VERTICAL GAZE USING AN EMBEDDED IMAGING DEVICE

RELATED APPLICATIONS

This application is related to U.S. patent application Ser. No. 11/027,001, now U.S. Pat. No. 7,715,597, U.S. Ser. No. 12/764,650, published as US20100202707, U.S. Ser. No. 11/460,218 now U.S. Pat. No. 7,792,335, U.S. Ser. No. 12/849,597, published as US20100033112, U.S. Ser. No. 12/851,333, U.S. Ser. No. 11/460,225, now U.S. Pat. No. 7,804,983, U.S. Ser. No. 11/460,227, now U.S. Pat. No. 7,551,754, U.S. Ser. No. 12/038,147, published as US20080205712, U.S. Ser. No. 12/824,204, U.S. Ser. No. 11/752,925, published as US20080292193, Ser. No. 12/354,707, published as US20090190803, U.S. Ser. No. 12/362,399, published as US20090189998, which are each hereby incorporated by reference.

BACKGROUND

It is desired to enable automatic detection of gaze direction. Several advantageous applications would benefit including gaming applications and power saving and launching features of computer devices, among others. Certain such gaming applications can take advantage of a flag as to whether a user is looking at a single screen or one or multiple screens, and/or whether the user is looking at one screen as compared to another, e.g., above or below a camera location. In case of Notebook/Display applications, this can provide utility for power save or launching applications based on where the user is looking.

It is recognized by the inventor in the present application that the capability of detecting an eye blink has been described at least at U.S. Pat. Nos. 7,551,754, 7,904,983, and 7,792,335 and United States published applications nos. US2008/0190803, US2011/0007174, US2009/0238419, US2009/0080713, US2009/0003708, US2009/0003661, US2009/0003652, US2009/0002514, US2008/0316327, US2008/0292193, US2008/0220750, and US2008/0219517, which belong to the same assignee as the present application and are hereby incorporated by reference. Moreover, even horizontal gaze detection has been described at least at US2009/0189998 which also belongs to the same assignee as the present application and is incorporated by reference. This is a further enhancement on top to allow for specific applications, typically other. An advantageous enhancement is recognized by the inventor in the present application that has application to digital still cameras (DSCs) and mobile camera-phones and also to laptops, desktops, set-top boxes, gaming applications and other applications benefiting from knowledge of eye gaze direction by a user of a camera-enabled appliance.

BRIEF DESCRIPTION OF THE DRAWINGS

FIGS. 6a-6b illustrate an example of annotations used for the Yale B Database.

FIGS. 7a-7d and 8a-8f show exemplary sets of images to which an active appearance model has been applied.

FIGS. 19a-19c show eyes with various degrees of eye gaze.

FIG. 20 shows the eye gaze angles for an eye pair.

DETAILED DESCRIPTIONS OF THE EMBODIMENTS

An advantageous technique is provided to detect and apply a vertical gaze direction of the eyes of a face within a digital image. The technique involves acquiring and detecting a digital image including at least part of a face including one or both eyes. At least one of the eyes is analyzed, and a degree of coverage of an eye ball by an eye lid is determined. Based on the determined degree of coverage of the eye ball by the eye lid, an approximate direction of vertical eye gaze is determined. The technique then permits a further action to be initiated based on the determined approximate direction of vertical eye gaze.

The technique may include determining that the at least one of the eyes is looking at a particular display screen of multiple display screens, including concluding that the determined approximate direction of eye gaze lies within a directional range of the particular display screen. The multiple display screens may include a top screen and a bottom screen, and the technique may involve comparing the determined degree of coverage of the eye ball by the eye lid to a threshold, and concluding that the direction lies within the directional range of the bottom screen when the determined degree of coverage exceeds the threshold and that the direction lies within the directional range of the top screen when the determined degree of coverage is less than the threshold.

The initiating a further action may include controlling an avatar of a gaming application.

The analyzing of the at least one of the eyes may include determining an approximate direction of horizontal gaze. The technique may involve initiating a further action or initiating a different action, or both, based at least in part on the determined approximate direction of horizontal gaze. The analyzing of the eye or eyes may include spectrally analyzing a reflection of light from the eye or eyes. The analyzing of the eye or eyes may include analyzing an amount of sclera visible on at least one side of the iris. The analyzing of the eye or eyes may include calculating a ratio of amounts of sclera visible on opposing sides of the iris.

The technique may include determining an angular offset of the face from normal, and determining the approximate direction of vertical eye gaze based in part on the angular offset and in part on the degree of coverage of the eye ball by the eye lid.

When the determined approximate direction of vertical gaze is determined not to lie within a directional range of a digital device, the further action may include a power save routine of the digital device. When the determined approximate direction of vertical gaze is determined to lie within a directional range of a digital device, then the further action may include a power on launch routine of the digital device.

Figure 1A:
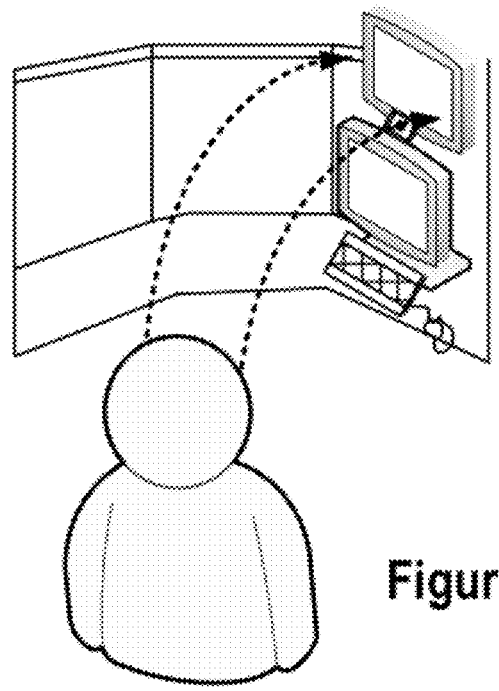
FIG. 1a illustrates a person looking at a monitor located above a camera.
Figure 1B:
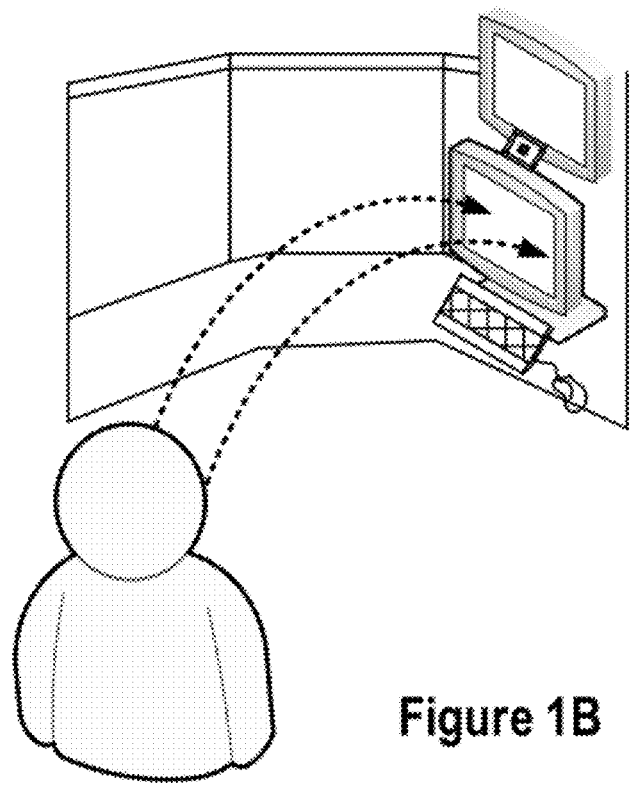
FIG. 1b illustrates a person looking at a monitor located below a camera.
Figure 2A:
FIG. 2a illustrates an image of the person captured by the camera in FIG. 1a looking at the monitor located above the camera.
Figure 2B:
FIG. 2b illustrates an image of the person captured by the camera in FIG. 1b looking at the monitor located below the camera.

Embodiments may be implemented into any device or application wherein it would be desired to know whether an eye is looking at the device or somewhere else such as above or below the device or even to the left or right of the device. For example, a camera in the DSI that sits in the middle of two screens as illustrated at FIGS. 1a-1b may be used to assist the device to determine whether the user is looking at the screen above it or below. Application to certain gaming applications can be developed following the user's gaze. In many cases, a person's head may remain steady as only her eye-lids either appear to open wide or close a bit depending on the vertical gaze direction. Particularly when a laptop computer is being used, the person's head may typically remain steady while the person's gaze may be either at the laptop or away from it. By determining whether the person is looking at the laptop or above it, for example, the system knows when the person is using the laptop and when she is not. In certain embodiments, the technique can discern whether a person using a camera-enabled appliance is looking at a keyboard or screen of a laptop or other handheld, portable or desktop computer, as well as whether she is looking away from either of them and/or at a second screen or not.

By determining where the person is looking by analyzing the persons's gaze, different automatic feedback events can be triggered by the computer. Applications to hand held gaming devices are also advantageous, wherein there may be one or two screens. Applications to notebooks, stand alone monitors, displays or television sets of many kinds controlled by various input devices such as keyboard, remote controls, handheld devices such as smartphones or gaming devices and other systems are advantageous. The direction of the gaze of a person's eyes can tell the device if it is being looked at or not. The system can determine to initiate certain actions, or not, based on the determined gaze direction.

Certain embodiments are arranged to allow for advanced usage of already existing face detection/tracking solutions, which are generally put in place for image quality enhancement purposes or other applications. For example, U.S. Pat. Nos. 7,860,274, 7,853,043, 7,848,549, 7,702,136, 7,693,311, 7,684,630, 7,634,109, 7,630,527, 7,616,233, 7,574,016, 7,565,030, 7,471,846, 7,466,866, 7,440,593, 7,362,368, 7,317,815, 7,315,630, 7,269,292, 7,864,990, 7,620,218, 7,469,055, 7,460,694, 7,460,695, 7,403,643, and 7,315,631, which belong to the same assignee as the present application, are hereby incorporated by reference. Face feature extraction as set forth in these patents and certain of the previously mentioned published applications are also advantageously utilized to discern eye features within acquired digital images, such as whether and to what extent an eye lid is covering parts of the eye and/or how much sclera, iris and/or pupil is showing and where with respect to the person's eye socket. This information can be used to determine or assist to determine the eye gaze direction of the person using the camera-enabled device.

As to vertical gaze, when a camera is located above a screen and/or keyboard, it can be determined that the person is not looking at the screen or keyboard if the eye is not significantly covered by the eye lid. That is, when a person is looking at something below a camera, it often appears that the person's eyes are shut or blinking or partially shut or in the process of blinking. The tilt or pose of the person's head relative to the camera may also be determined, so that it may be taken into account in determining eye gaze.

Other applications in gaming and otherwise may use other facial expressions besides blink/non-blink, such as smile/non-smile or frown, anger, fear, surprise, or a certain contortion or shape of the lips or eye brows to determine for example an action on a display screen. Other gestures such as hand gestures can also be detected and used to determine further actions.

Figure 3:
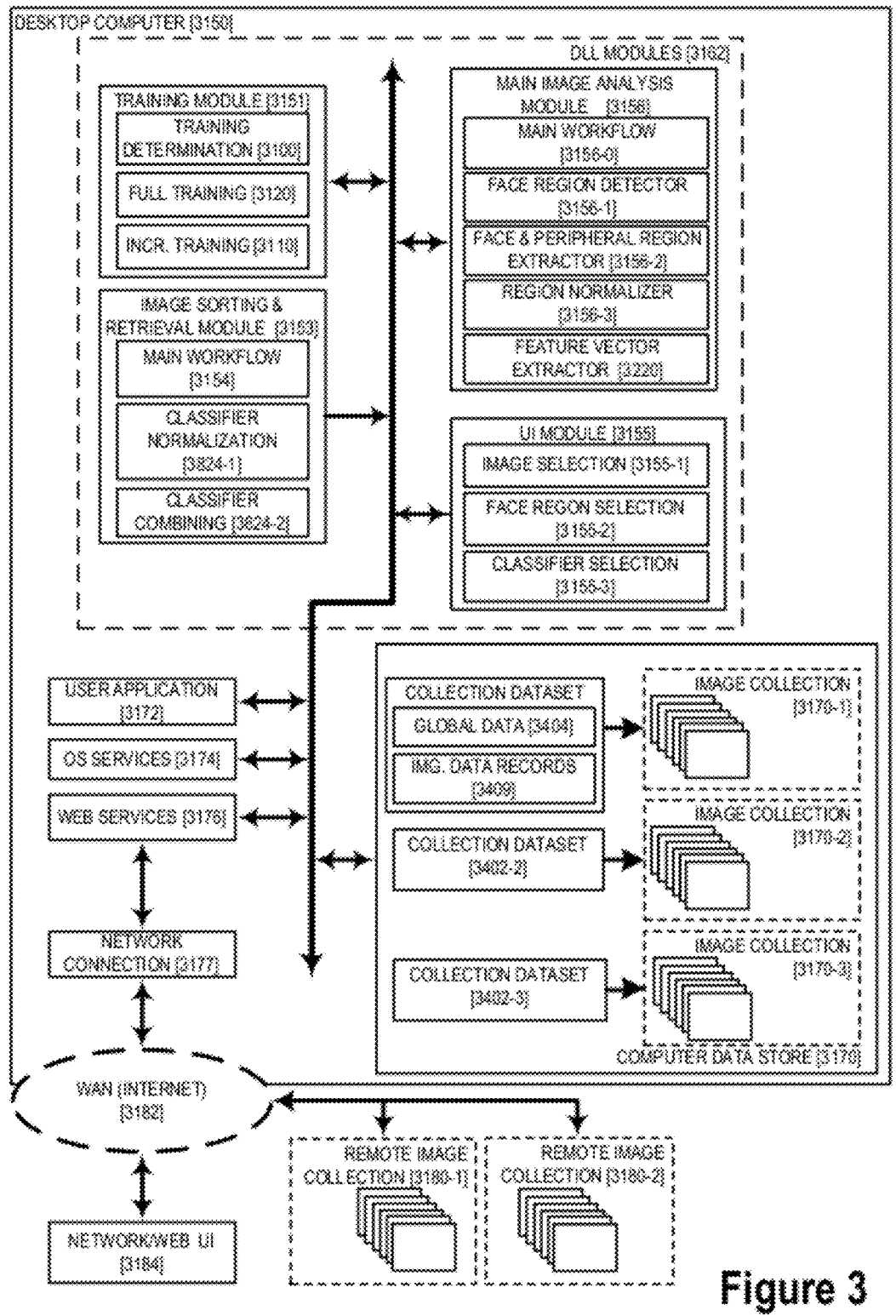
FIG. 3 is a block diagram of an image processing system according to a preferred embodiment of the present invention.

Certain embodiments will now be described in relation to FIG. 3. This takes the form of a set of software modules 3162 implemented on a desktop computer 3150 or on a handheld or otherwise portable processor-based device particularly having an image acquisition component. Further embodiments include implementations within embedded imaging appliances such as digital cameras and camera-phones.

Software Modules on a Computer

In one embodiment, a desktop, laptop or handheld or other portable computer or other processor-based environment is provided. The technique may either be run as a stand-alone program, or alternatively may be integrated into existing applications or operating system (OS) system components to improve their functionality.

Image Analysis Module

This module cycles through a set of images 3170-1 . . . 3180-2 and determines, extracts, normalizes and analyzes face regions and associated peripheral regions to determine feature vectors for a plurality of face and non-face classifiers. The module then records this extracted information in an image data set record.

Face region normalization techniques can range from a simple re-sizing of a face region to more sophisticated 2D rotational and affine transformation techniques and to highly sophisticated 3D face modeling methods.

Image Collection Training Process

Before the modules 3162 can perform their main function of image sorting and retrieval, a training process is first initiated on an image collection in certain embodiments. In these embodiments, an exemplary image collection may be typically a set of images contained within a subdirectory of the file system on a desktop PC or other processor-based device. Thus, when a process controlling the modules 3162 is active and a user switches into a subdirectory containing images, the module 3156 loads this new image collection and determines firstly if there are images which have not contributed to the training process and secondly if the number of such unutilized images warrants a full retraining of the image collection or if, alternatively, an incremental training process can be successfully employed.

A process is also provided to determine which training method (full, incremental or no training) is to be applied to an image collection. In response to some external event (examples include user input or switching to a file system directory containing images or a timed, periodic check of known image collections), the training mode determination process first checks if new, unutilized images have been added to the image collection since the last determination of training mode. If now new images have been added, or the number of new images is less than a predetermined threshold value or percentage then no training is required and the training mode determination process may exit. However, if enough unutilized new images have been added the next step is to determine if incremental training is possible. This decision will depend partly on the nature of the classifiers used in the person recognition process, partly on the number of unutilized images and partly on the number of images and determined face regions in the previously trained image collection.

In this embodiment, the face and non-face recognition techniques employed can be combined linearly which allows incremental training even for quite large additional subsets of new images which are added to a previously trained main image collection. However this embodiment does not preclude the use of alternative face or non-face recognition methods which may not support linear combination, or may only support such combinations over small incremental steps. If it is determined that incremental training is possible then the training mode determination step exits to the incremental training step. Alternatively, if there are too many new images, or the classifiers employed are not susceptible to linear combination between image sets then a full retraining may be undertaken.

A system in accordance with a preferred embodiment represents an improvement over the system described at US published application number 2002/0136433 to Lin, which is hereby incorporated by references, and which describes an "adaptive facial recognition system". The approach described by Lin requires the determination of feature vectors based on a fixed set of basis vectors and a "generic" or "mean" face previously determined through offline training Incremental retraining may be performed based on the automatic determination of face regions within newly acquired images or sets of such images.

A further improvement is that the facial regions determined and normalized by the module 156 may be re-utilized in subsequent re-training operations. As the automated determination of valid face regions within an image and the normalization of such regions is the most time-consuming part of the training process—typically representing 90-95% of the time involved for training a typical image collection—this means that subsequent combining of several image collections into a "super-collection" and re-training of this "super-collection" can be achieved with a substantially reduced time lag.

Image Selection Process

A selection process is performed in certain embodiments before the image sorting/retrieval process. A selected image will either be a newly selected/acquired image, in which case it is loaded, selected or acquired, and then subjected to face (pattern) detection. This is followed by a feature vector extraction process which may additionally incorporate related peripheral region extraction and region normalization steps. The extracted feature vector will be used for comparing with pre-determined feature vectors obtained from an image collection data set. Alternatively, if an image is a member of an existing image collection, then the relevant feature vectors will have been previously extracted and it is only necessary to load the previously acquired image and the appropriate image data record and image collection data set. The image sorting/retrieval module may now be called.

Figure 4:
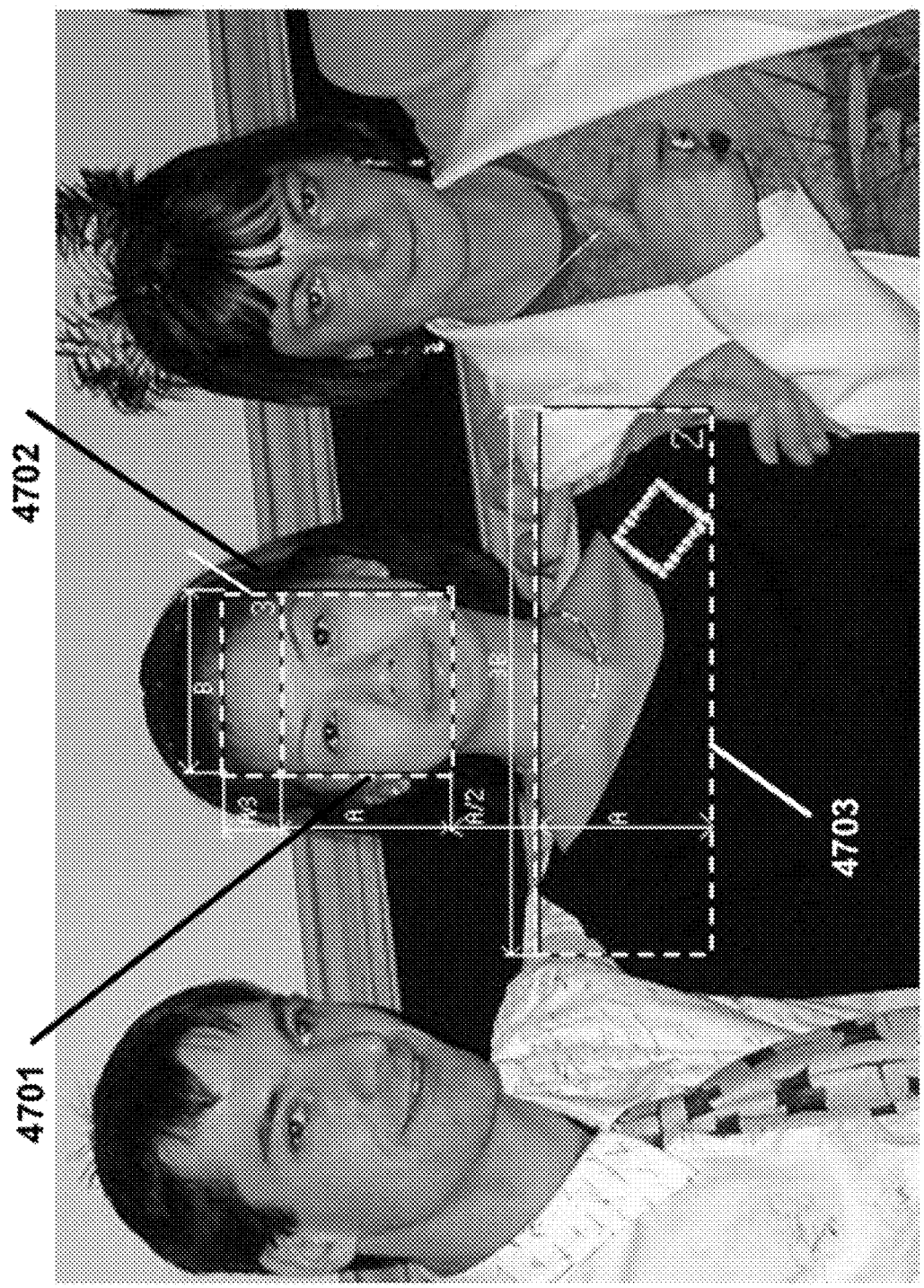
FIG. 4 illustrates a face region determined by a face detector module and the associated peripheral regions which are used for colour pattern matching of a person's hair and upper body clothing.

FIG. 4 illustrates a determined face region 4701, and its associated peripheral regions 4702, 4703. The dimensions and relative locations of these regions are exemplary and may be adapted according to additional determining steps after the main face region is detected. Further, additional peripheral regions may be added to specifically identify items such as ear-rings, necklaces, scarves, ties and hats, and eye lids and eye features such as pupil, iris and sclera, are particularly identified for determining eye gaze direction.

Both the face region and a full body region may also be employed for color/texture analysis and can be used as additional classifiers for the sorting/retrieval process (see also Chen et al in "Face annotation for family photo album management", published in the International Journal of Image and Graphics Vol. 3, No. 1 (2003), hereby incorporated by reference).

Figure 5A:
FIGS. 5a-5b illustrate face, eye or mouth detection, or combinations thereof, in accordance with one or more preferred embodiments.
Figure 5B:
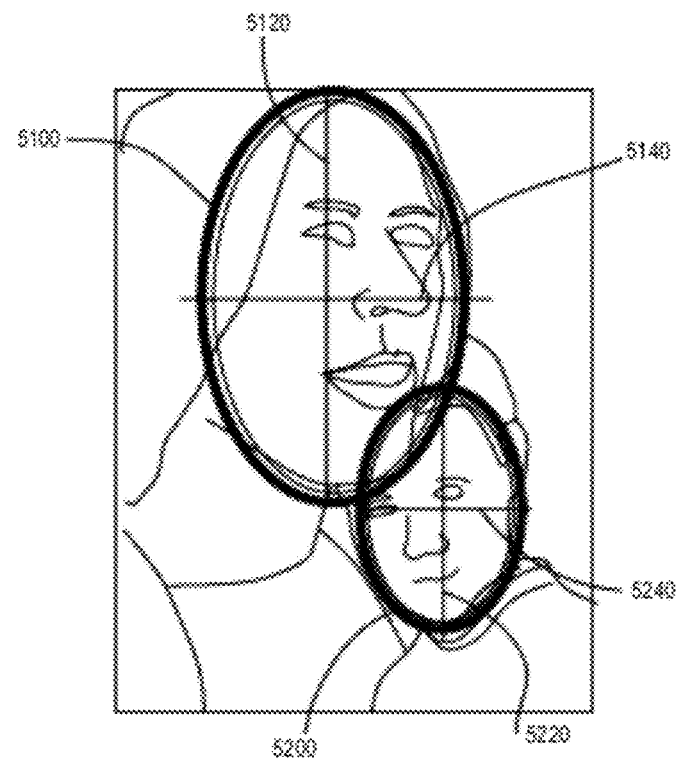

Referring to FIGS. 5a-5b, which describe automatic rotation of an image based on the location and orientation of eyes and/or one or more eye regions such as pupil, iris and/or sclera, faces, other face features, or other non-facial features. An image of two faces is provided in FIG. 5a. The faces may not be identically oriented, and the faces may be occluding. In this example, both eyes are showing on each face, but only one eye might be showing in other cases.

The software in the eye or face detection stage will mark the two faces or the four eyes of the mother and son, e.g., the faces may be marked as estimations of ellipses 5100 and 5200, respectively. Using known mathematical means, such as the covariance matrices of the ellipses, the software can determine the main axes of the two faces 5120 and 5220, respectively as well as the secondary axis 5140 and 5240. Even at this stage, by merely comparing the sizes of the axes, the software may assume that the image is oriented 90 degrees, in the case that the camera is in landscape mode, which is horizontal, or in portrait mode which is vertical or +90 degrees, aka clockwise, or −90 degrees aka counter clockwise. Alternatively, the application may also be utilized for any arbitrary rotation value. However, this information may or may not suffice to decide whether the image is rotated clockwise or counter-clockwise.

Certain embodiments involve extracting one or more pertinent features of a face, which are usually highly detectable. Such objects may include the eyes and the lips, or the nose, eye brows, eye lids, features of the eyes such as pupil, iris and/or sclera, hair, forehead, chin, ears, etc. The combination of the two eyes and the center of the lips creates a triangle which can be detected not only to determine the orientation of the face but also the rotation of the face relative to a facial shot. There are other highly detectable portions of the image which can be labeled and used for orientation detection, such as the nostrils, the eyebrows, the hair line, nose bridge and the neck as the physical extension of the face, etc. In the examples of FIGS. 6a-6b, the eyes, nose and lips are provided as examples of such facial features, as well as the edge of the lower portion of the face Based on the location of the eyes, if found, and the mouth, the image might for example ought to be rotated in a counter clockwise direction.

Note that it may not be enough to just locate the different facial features, but such features may be compared to each other. For example, the color of the eyes may be compared to ensure that the pair of eyes originated from the same person.

Alternatively, the features of the face may be compared with preview images. Such usage may prevent a case where a double upper eyelid may be mistaken to a semi closed eye. Another example is that if the process combined the mouth with the eyes, the orientation would have been determined as clockwise. In this case, the software detects the correct orientation by comparing the relative size of the mouth and the eyes. The above method describes exemplary and illustrative techniques for determining the orientation of the image based on the relative location of the different facial objects. For example, it may be desired that the two eyes should be horizontally situated, the nose line perpendicular to the eyes, the mouth under the nose etc. Alternatively, orientation may be determined based on the geometry of the facial components themselves. For example, it may be desired that the eyes are elongated horizontally, which means that when fitting an ellipse on the eye, such as described in blocs 2140 and 2160, it may be desired that the main axis should be horizontal. Similar with the lips which when fitted to an ellipse the main axis should be horizontal. Alternatively, the region around the face may also be considered. In particular, the neck and shoulders which are the only contiguous skin tone connected to the head can be an indication of the orientation and detection of the face.

A process for determining the orientation of images can be implemented in certain embodiments as part of a digital display device. Alternatively, this process can be implemented as part of a digital printing device, or within a digital acquisition device.

A process can also be implemented as part of a display of multiple images on the same page or screen such as in the display of a contact-sheet or a thumbnail view of images. In this case, the user or the device itself may approve or reject the proposed orientation of the images individually or by selecting multiple images at once. In the case of a sequence of images, the orientation of images may be determined based on the information as approved by the user regarding previous images.

Building an Initial Identity Model

The reference shape used to generate the texture vectors should be the same one for all models, i.e. either identity or directional lighting models. It is advantageous for many applications to be able to determine specialized subspaces, such as the identity subspace or the directional lighting subspace.

A first step may involve modeling an identity variation between individuals. For training this identity-specific model we only use images without directional lighting variation. Ideally these face images should be obtained in diffuse lighting conditions. Textures are extracted by projecting the pixel intensities across the facial region, as defined by manual annotation, into the reference shape—chosen as the mean shape of the training data. FIG. 6a-6b illustrate examples of annotations used for the Yale B Database.

The number of landmark points used should be kept fixed over the training data set. In addition to this, each landmark point has the same face geometry correspondence for each of the images in accordance with certain embodiments. The landmarks should predominantly target fiducial points, which permit a good description of facial geometry, allowing as well the extraction of geometrical differences between different individuals.

If this has not already been performed for quality analysis, the defective face region(s) as well as the corresponding high quality defect-free face region may be subjected to active appearance module (AAM) analysis. Referring now to FIGS. 7(*a*) to 7(*d*), which illustrate some images including face regions which have been processed by the AAM module. In this case, the model represented by the wire frame superimposed on the face is tuned for a generally forward facing and generally upright face, although separate models can be deployed for use with inclined faces or faces in profile. Once the model has been applied, it returns a set of coordinates for the vertices of the wire frame; as well as texture parameters for each of the triangular elements defined by adjacent vertices. The relative coordinates of the vertices as well as the texture parameters can in turn provide indicators linked to the expression and inclination of the face which can be used in quality analysis as mentioned above.

An AAM module can also be used in the facial region analysis to provide in indicator of whether a mouth or eyes are open, i.e. smiling and/or not blinking, or in certain embodiments looking up or down relative to a camera location. The AAM module can also be used to help determine certain steps implemented by a super-resolution module, e.g., whether facial regions or eye regions are similarly aligned or inclined for selection before super-resolution.

So, using FIG. 7(*a*) as an example of a facial region produced by super-resolution of low resolution images, it is observed that the set of vertices comprising the periphery of the AAM model define a region which can be mapped on to corresponding set of peripheral vertices of FIG. 7(*b*) to FIG. 7(*d*), where these images have been classified and confirmed by the user as defective facial regions and candidates for correction.

Referring now to FIGS. 8(*a*)-8(*f*), the model parameters for FIG. 8(*a*) or 8(*b*), which might represent super-resolved defect free face regions, could indicate that the left-right orientation of these face regions would not make them suitable candidates for correcting the face region of FIG. 8(*c*). Similarly, the face region of FIG. 8(*f*) could be a more suitable candidate than the face region of FIG. 8(*e*) for correcting the face region of FIG. 8(*d*).

In any case, if the super-resolved face region is deemed to be compatible with the defective face region, information from the super-resolved face region can be pasted onto the main image by any suitable technique to correct the face region of the main image. The corrected image can be viewed and depending on the nature of the mapping, it can be adjusted by the user, before being finally accepted or rejected. So for example, where dithering around the periphery of the corrected face region is used as part of the correction process, the degree of dithering can be adjusted. Similarly, luminance levels or texture parameters in the corrected regions can be manually adjusted by the user, or indeed any parameter of the corrected region and the mapping process can be manually adjusted prior to final approval or rejection by the user.

While AAM provides one approach to determine the outside boundary of a facial region, other well-known image processing techniques such as edge detection, region growing and skin or eye color analysis may be used in addition or as alternatives to AAM. However, these may not have the advantage of also being useful in analyzing a face or eye region for defects and/or for pose information. Other techniques which can prove useful include applying foreground/background separation to either the low-resolution images or the main image prior to running face detection to reduce overall processing time by only analyzing foreground regions and particularly foreground skin segments. Local color segmentation applied across the boundary of a foreground/background contour can assist in further refining the boundary of a facial region.

Once the user or processor-based device is satisfied with the placement of the reconstructed face region, it may be selected to merge it with the main image; alternatively, if the reconstruction process cancelled or modified. These actions are typically selected through buttons on the camera user interface or automatically as a processor is programmed, where the correction module is implemented on the image acquisition device.

As practical examples, a system may be used to correct an eye defect or at least to identify an eye configuration such as blink/non-blink and take a further action based thereon. An example may be used of a configuration where one or both eyes is/are shut in the main image frame due to the subject "blinking" during the acquisition. Immediately after the main image acquisition, the user may be prompted to determine if they wish to correct the image as being defective, or the device may automatically take an action based on the configuration. If the user confirms this in the semi-automatic process or if the device is programmed for automatic action in this regard, then the camera begins in certain embodiments by analyzing a set of face regions stored from preview images acquired immediately prior to the main image acquisition. A set of, say, 20 images may be saved from the one second period immediately prior to image acquisition. As the configuration was a blinking eye, the initial testing may determine for example that the last, say, 10 of these preview images are not useful. However the previous 10 images are determined to be suitable. Additional testing of these images might include the determination of facial pose, eliminating images where the facial pose varies more than 5% from the averaged pose across all previews; a determination of the size of the facial region, eliminating images where the averaged size varies more than 25% from the averaged size across all images. The reason the threshold is higher for the latter test is that it is easier to rescale face regions than to correct for pose variations. In certain embodiments, video sequences may be used such that for example there is no distinction between previews and a main image.

In variations of the above described embodiment, the regions that are combined may include portions of the background region surrounding the main face region. This is particularly important where the configuration to be identified in the main acquired image is due to face motion during image exposure. This will lead to a face region with a poorly defined outer boundary in the main image and the super-resolution image which is superimposed upon it typically incorporates portions of the background for properly correcting this face motion defect. A determination of whether to include background regions for face reconstruction can be made by the user, or may be determined automatically after a configuration analysis is performed on the main acquired image. In the latter case, where the image is blurred due to face motion, then background regions will normally be included in the super-resolution reconstruction process. In an alternative embodiment, a reconstructed background can be created using either (i) region infilling techniques for a background region of relatively homogeneous color and texture characteristics, or (ii) directly from the preview image stream using image alignment and super-resolution techniques. In the latter case the reconstructed background is merged into a gap in the main image background created by the separation of foreground from background; the reconstructed face region is next merged into the separated foreground region, specifically into the facial region of the foreground and finally the foreground is re-integrated with the enhanced background region.

After applying super-resolution methods to create a higher resolution face region from multiple low-resolution preview images, some additional scaling and alignment operations are normally involved. Furthermore, some blending, infilling and morphological operations may be used in order to ensure a smooth transition between the newly constructed super-resolution face region and the background of the main acquired image. This is particularly the case where the defect to be corrected is motion of the face during image exposure. In the case of motion defects it may also be desirable to reconstruct portions of the image background prior to integration of the reconstructed face region into the main image.

It is also be desirable to match the overall luminance levels of the new face region with that of the old face region, and this is best achieved through a matching of the skin color between the old region and the newly constructed one. Preview images are acquired under fixed camera settings and can be over/under exposed. This may not be fully compensated for during the super-resolution process and may involve additional image processing operations.

While the above described embodiments have been directed to replacing face regions within an image, AAM can be used to model any type of feature of an image. So in certain embodiments, the patches to be used for super-resolution reconstruction may be sub-regions within a face region. For example, it may be desired to reconstruct only a segment of the face regions, such as an eye or mouth region, rather than the entire face region. In such cases, a determination of the precise boundary of the sub-region is of less importance as the sub-region will be merged into a surrounding region of substantially similar color and texture (i.e. skin color and texture). Thus, it is sufficient to center the eye regions to be combined or to align the corners of the mouth regions and to rely on blending the surrounding skin colored areas into the main image.

In one or more of the above embodiments, separate face or eye regions may be individually tracked (see e.g., U.S. Pat. No. 7,315,631, which is hereby incorporated by reference). Regions may be tracked from frame-to-frame. Preview or post-view face regions can be extracted, analyzed and aligned with each other and with the face region in the main or final acquired image. In addition, in techniques according to certain embodiments, faces may be tracked between frames in order to find and associate smaller details between previews or post-views on the face. For example, a left eye from Joe's face in preview N may be associated with a left eye from Joe's face in preview N+1, or between different video frames. These may be used together to form one or more enhanced quality images of Joe's eye. This is advantageous because small features (an eye, a mouth, a nose, an eye component such as an eye lid or eye brow, or a pupil or iris or sclera, or an ear, chin, beard, mustache, forehead, hairstyle, etc. may not be as easily traceable between frames as larger features, and their absolute or relative positional shifts between frames can tend to be more substantial relative to their size.

Systems and methods are described in accordance with preferred and alternative embodiments. These techniques provide enhanced functionality and improved usability, as well as avoiding missed shots. With them, a digital camera is able to decide when a subject's facial expression may be inappropriate, unsatisfactory or non-desirable or may indicate an eye gaze direction or other instruction to a gaming application or to a power save or computer launch application or another action. One example is blinking or looking down below a camera location, and others include frowning, occlusions and shadowing. The capture device can either not take the picture, delay the acquisition for an appropriate duration, immediately take another picture, warn a camera user, take steps to enhance an unsatisfactory image later, or move an avatar during a gaming event, or combinations of these or other steps. The camera may delay taking another picture for a certain amount of time such as roughly 300 milliseconds seconds or for an average blinking interval, or until the blinking is determined to be over. The user could be warned before snapping a picture or after the picture has been taken that the subject's eyes may have been closed or semi closed.

A predictive system is provided that qualifies or disqualifies images if eyes are closed or partially closed from running certain further programming operations. The system predicts when a picture cannot be taken or when a gaming application should be paused, i.e., those times when a detected blinking process will be ongoing until it is completed or when a gaming player is not watching the screen.

Disqualified or selected images may be already captured and disqualified or selected in real time or in a post-capture filtering operation, either within the camera or on an external apparatus. The system may take multiple images to enhance the probability that one or more of the images will not be disqualified nor initiate or delay a program operation for including one or more blinking eyes. Such system is useful in the case of a group shot where the probability of one subject in the process of blinking increases as the number of subjects increase or where a period of time of capture of consecutive video frames increases the chances that a person will change gaze angle during the period. The system, based on the number of faces in the image, can automatically determine the amount of images to be sequentially taken to provide a probability that at least one of the images will have no blinking eyes, or eyes directed at a particular gaze angle, that is above or below a threshold amount, e.g., 50%, 60%, 67%, 70%, 75%, 80%, 90% or 95%.

An image may be generated as a combination of a present image, and a preview, post-view or other full resolution image. For example, the combination image may include a face region and some background imagery, wherein one or both eye regions, which are unsatisfactorily closed or partially closed in the present image, are replaced with one or both open eyes from the preview, post-view or other full resolution image. In another application, a person's face may be used as part of a display along with a background associated with the gaming application. This feature may be combined with features presented in U.S. Pat. No. 7,317,815, which is assigned to the same assignee as the present application and is hereby incorporated by reference. In the '815 patent, a method of digital image processing using face detection is described. A group of pixels is identified that corresponds to a face within a digital image. A second group of pixels is identified that corresponds to another feature within the digital image. A re-compositioned image is determined including a new group of pixels for at least one of the face and the other feature.

The embodiments herein generally refer to a single face within a digital image or scene (e.g., prior to image capture or that may have already been digitally captured), and generally to "an eye". However, these descriptions can extended to both eyes on a single face, and to more than a single face (group shot), and the camera can disqualify or select the scene if a certain number of one or two, three, four or more eyes are determined to be blinking. The camera is able to perform the disqualifying or selecting and/or other operations, as described herein or otherwise, until a high percentage or all of the subjects have one or both of their eyes open or as a precedent to initiating another action.

In one embodiment, the camera will take the picture or perform another action right after the subject completes a blinking process. The present system can be used to disqualify or select an image having a subject whose eyes are closed, and can take multiple images to prevent having no images that lack blinking or to ensure that the person is not just looking away for a very short time such that no action will be initiated without the person looking away for at least a threshold time.

The present system can also look for comparison of changes in facial features (e.g., of the eyes or mouth), between images as potentially triggering a disqualifying of a scene or initiating of a further action. In such a case, the system may distinguish between a squint which is somewhat permanent or of longer duration during the session than a blink which is more a temporary state. These may be detected when a person looks below a camera position for a somewhat long time appearing as a squint or as a person who has fallen asleep, versus a person looking below the camera for just a second appearing as a blink. The system may also through a comparison of multiple images determine the difference between eyes that are naturally narrow due to the location of the upper-eye-lid or the epicanthal fold, or based on a determined nationality of a subject person, e.g., distinguishing Asian from Caucasian eyes.

The description herein generally refers to handling a scene wherein an object person appears to be blinking, squinting or sleeping (e.g., looking below the camera for different periods of time) or has eyes wide open (e.g., looking above the camera). However, certain embodiment may involve other features, e.g., when a person is frowning, or when a person is gesturing, talking, eating, having bad hair, or otherwise disposed, or when another person is putting bunny ears on someone, or an animal or other person unexpectedly crosses between the camera and human subject, or the light changes unexpectedly, or the wind blows, or otherwise. One or more or all of these circumstances may trigger an action by the processor-based device such as a change of display screen or power save/launch, and can be manually or automatically set and/or overridden.

Figure 9:
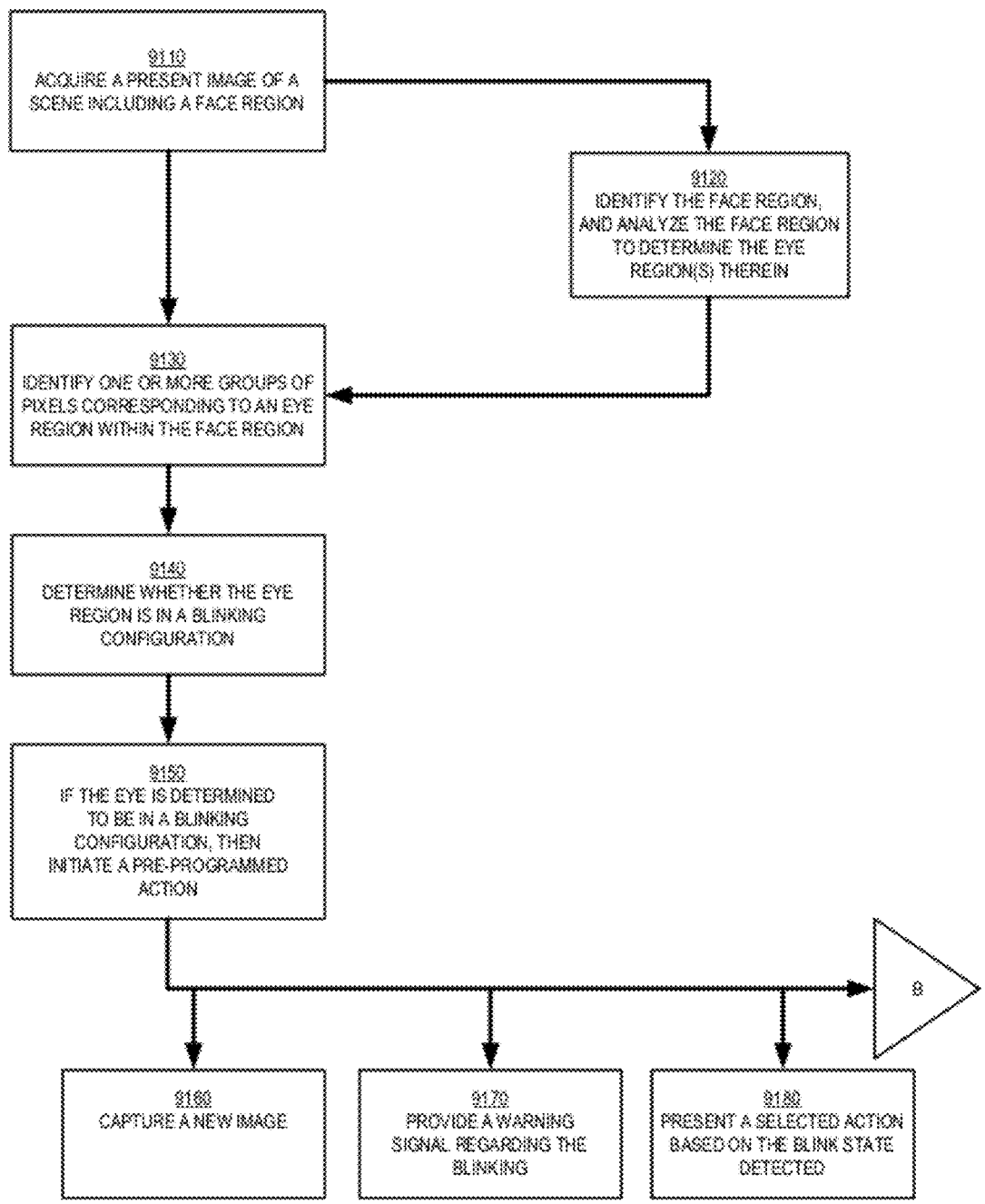
FIG. 9 illustrates a method for disqualifying a scene that includes a blinking eye in accordance with a preferred embodiment.

FIG. 9 illustrates a method for determining a scene that includes a blinking eye in accordance with certain embodiments. A present image of a scene including a face region is acquired at 9110. Optionally, the face region is identified at 9120, and the face region analyzed to determine one or both eye regions therein. One or more groups of pixels corresponding to an eye region within the face region are identified at 9130. It is determined whether the eye region is in a blinking process at 9140. If the eye is determined to be in a blinking process at 9140 (e.g., looking down), then a pre-programmed action is initiated at 9150, or such may occur when the eye is determined not be blinking (e.g., looking up). At this point, the process can simply stop or start again from the beginning, or a new image may be captured due to the action being initiated or a new image may be captured and analyzed at 9160. A warning signal may be provided regarding blinking (looking down) or non-blinking (looking up) at 9170. Full resolution capture of an image of the scene may be delayed or a selected action may be triggered or delayed, or a power save or launch may be initiated, etc., at 9180. Further processing of a present image may be stopped or a combination image may be assembled as a way of enhancing a disqualified image, or the process may be continued in accordance with the present gaze angle of the user.

Figure 10:
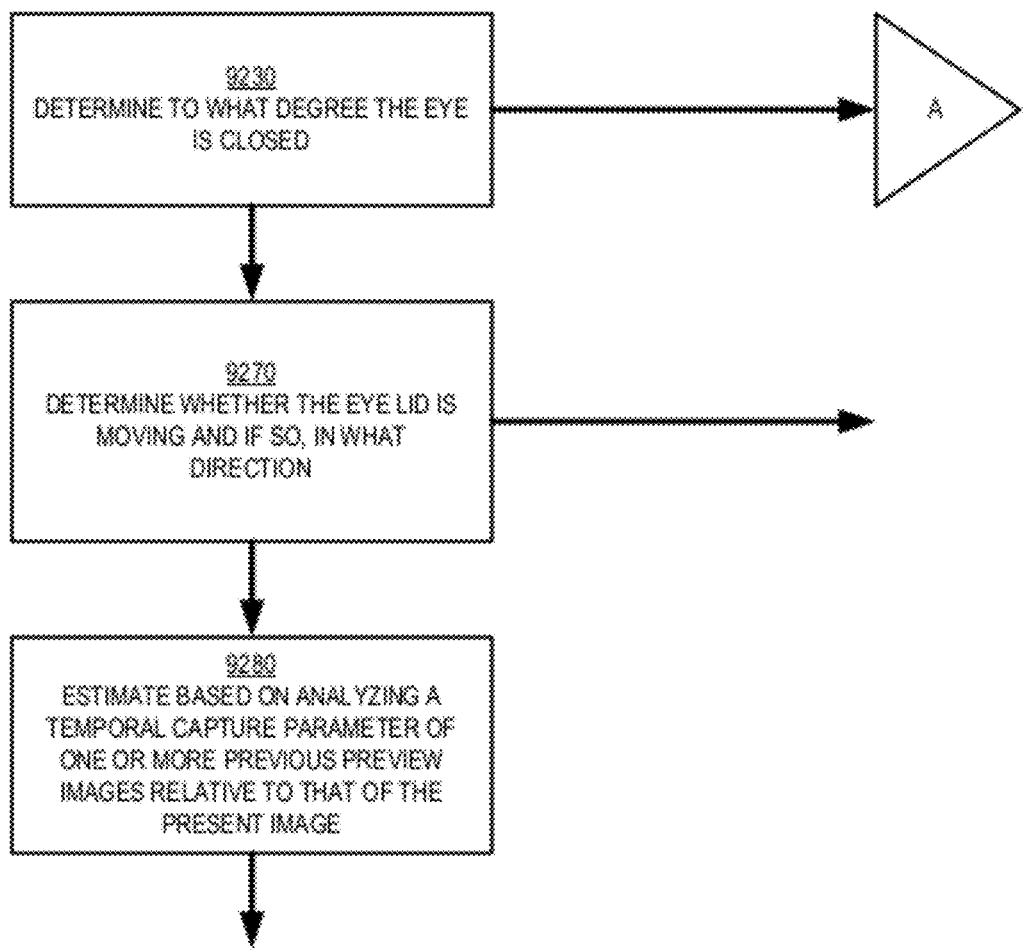
FIG. 10 illustrates a method of predicting a blinking completion time interval in accordance with a preferred embodiment.

FIG. 10 illustrates a method of predicting a blinking completion time interval in accordance with a preferred embodiment. It may be predicted when the blinking process will be completed, and a disqualifying interval may end at a predicted blinking completion time. Such interval may be set at a predetermined wait time. This may be set from a knowledge of an average blink of one quarter of a second or 250 milliseconds, or in a range from approximately 200-400 milliseconds, or to 0.6, 0.8 or 1.0 seconds, however setting the wait time too long to ensure the blinking is complete disadvantageously permits a second blink to begin or simply makes everyone involved in taking the picture have to wait to too long for the disqualifying period to end. A more precise determination of the end of the blinking process is desired.

A point of a complete blinking process or degree to which an eye appears to be closed or percentage of coverage of the iris, pupil or sclera portion may be determined to discern an eye gaze angle at 9230 of FIG. 10. Various options are provided at FIG. 10 and FIG. 11 for inclusion in the process. A complete blinking, squinting or sleeping process duration may be determined based on capture of a series of images. A fraction of a detected iris, pupil and/or sclera may be determined, and the process may include determining whether the eye is opening or closing, and/or determining a degree to which the eye is open or shut.

Figure 11:
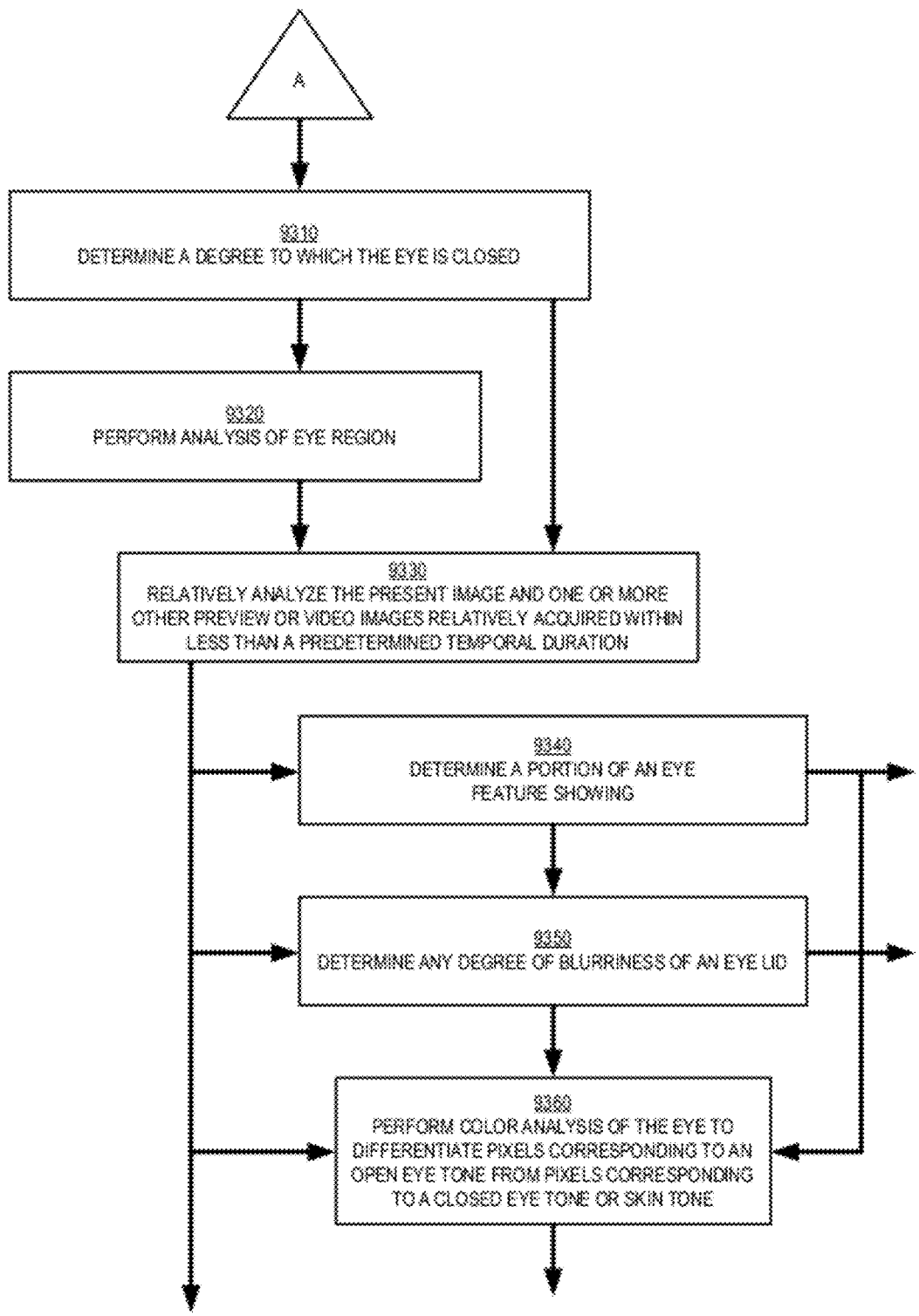
FIG. 11 illustrates a method of determining a degree to which an eye is open or shut in accordance with a preferred embodiment.
Figure 12:
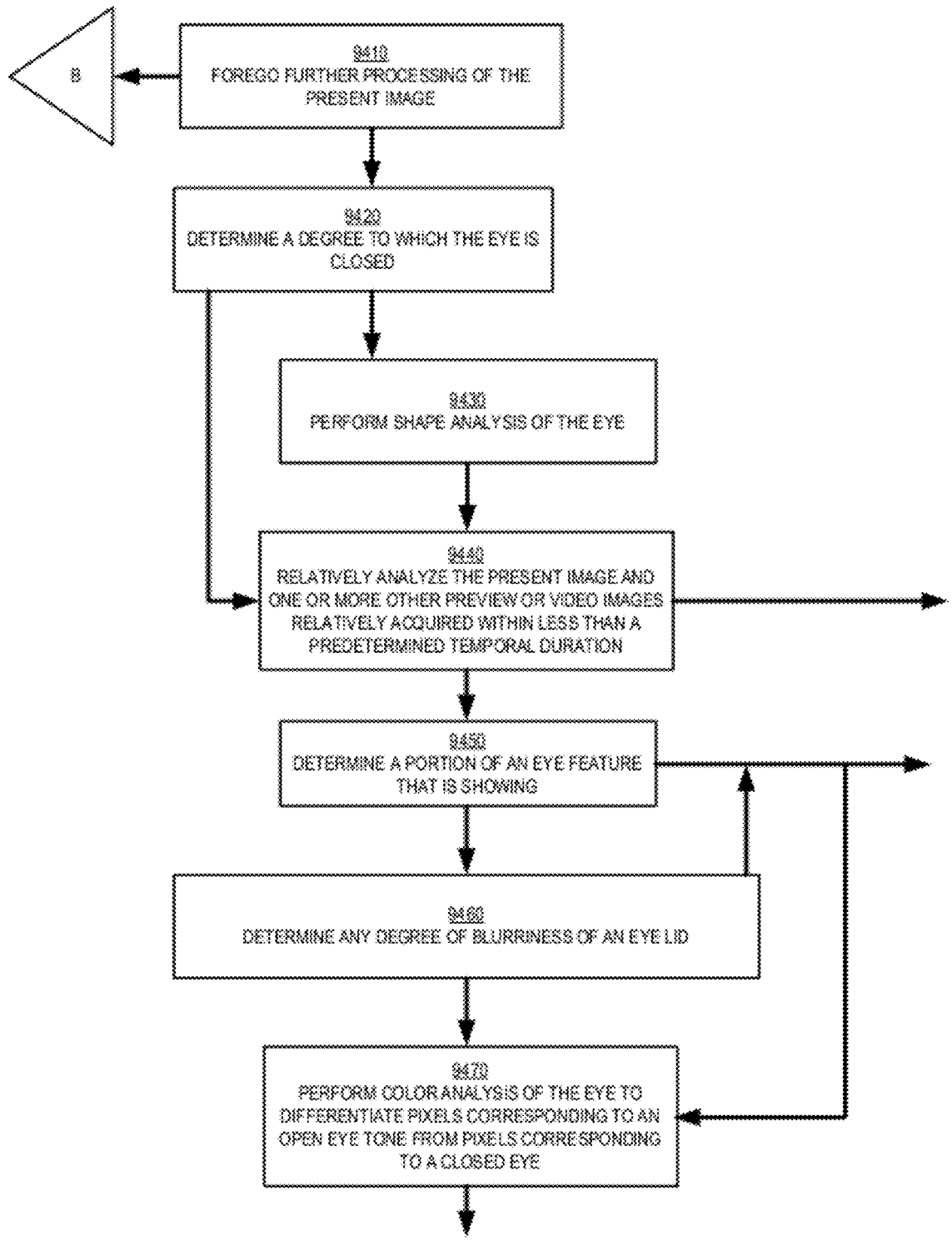
FIG. 12 illustrates a method of determining whether to forego further processing of an image in accordance with a preferred embodiment.

The determining a degree to which an eye may be open or shut is further provided at 9310 of FIG. 11. To do this, the present image is preferably analyzed at 9320 relative to one or more other preview or video images acquired within less than a duration of a complete blinking, squinting or sleeping process. An optional determination of a degree of blurriness at 9330 of one or both eye lids may facilitate a determination of blink speed. A portion of a pupil, iris, one or both eye lids or an eye white that is/are showing may be determined at 9340 to facilitate determining how open or shut the blinking eye is. Color analysis 9350 and shape analysis 9360 may also be performed to differentiate pixels corresponding to features of open eyes such as a pupil, an iris and/or an eye white, from pixels corresponding to features of shut eyes, or eye lids that would appear in an eye region of a present scene.

A method is also provided to determine whether to forego further processing of an image 9410 in accordance with an embodiment. In this case, determining a degree to which the eye is open or shut 9420 is performed. In this embodiment, a threshold degree of closure of an eye may be preset, e.g., such that when an image is analyzed according to 9420, 9430, 9440, 9450, 9460, or 9470, or combinations thereof, similar to any or a combination of 9310-9360 of FIG. 11, then if the eye is shut to at least the threshold degree or greater, then a pre-programmed action is taken, because the eye is too far shut or too far open. This can correspond to a situation wherein an eye appears to be blinking or not blinking, or where an eye is at the very start or very end of a blinking process, such that the degree to which the eye is open is sufficient for taking a certain pre-programmed action.

Figure 13:
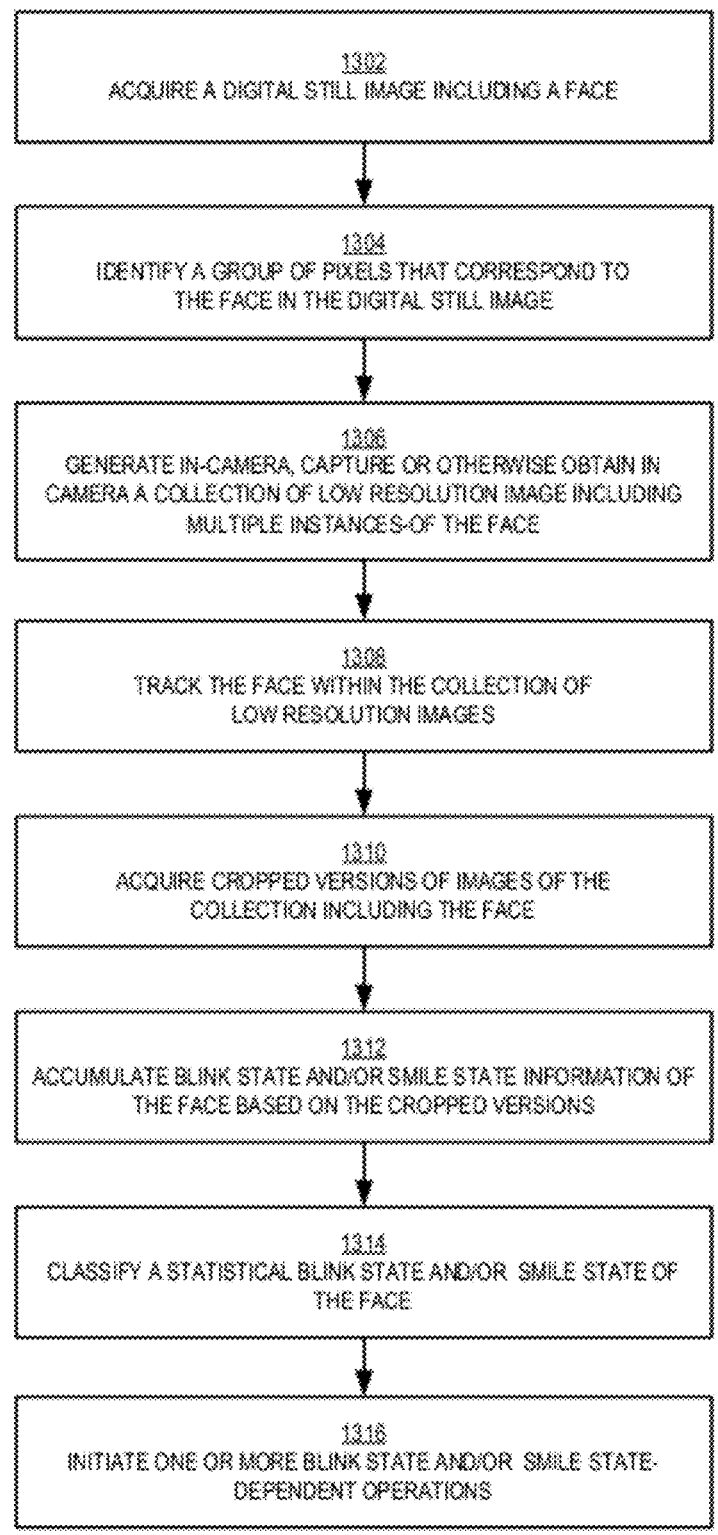
FIG. 13 illustrates a technique of processing a still image including a face.
Figure 14:
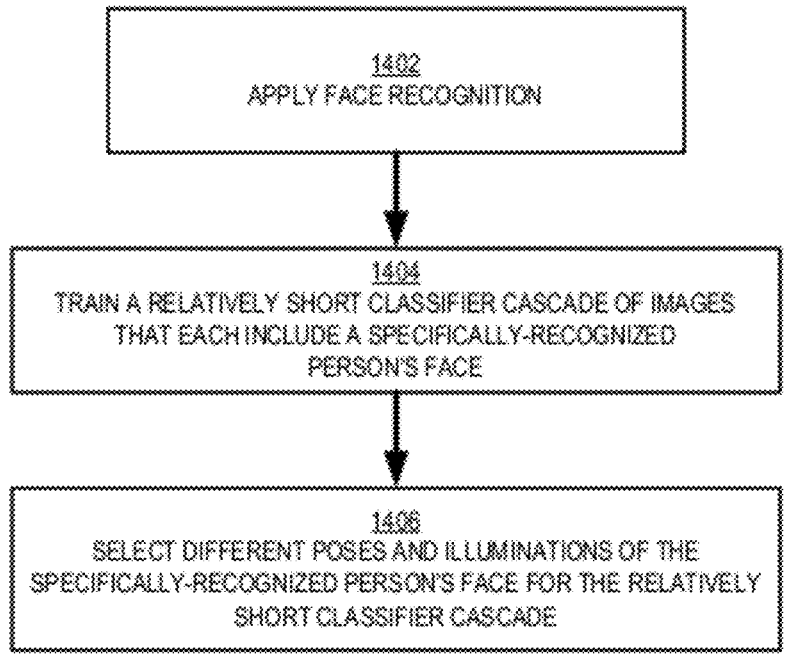
FIG. 14 illustrates a further technique of processing a still image including a face.
Figure 15:
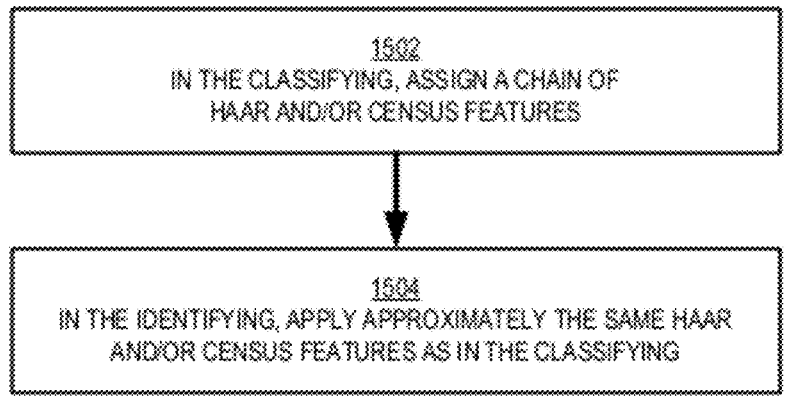
FIG. 15 illustrates specific classifying and identifying processes for use with the technique of FIG. 13.

FIGS. 13-15 illustrate a smile detector in accordance with an exemplary embodiment. Referring first to FIG. 13, a digital still image is acquired that includes a face at block 1302. At block 1304, a group of pixels is identified that corresponds to the face in the digital still image. At block 1306, a collection of low resolution images is generated in-camera, captured or otherwise obtained in-camera including multiple instances of the face. The face is tracked at block 1308 within the collection of low resolution images. At block 1310, cropped versions are acquired of images of the collection including the face. Blink state and/or smile state information of the face is accumulated based on the cropped versions at block 1312. A statistical blink state and/or smile state of the face is classified at block 1314. One or more blink state and/or smile state-dependent operations is/are initiated at block 1316.

FIG. 14 illustrates a technique including applying faced recognition at block 1402 in accordance with certain embodiments. At block 1404, a relatively short classifier cascade of images is trained that includes a specifically-recognized person's face. At block 1406, different poses and/or illuminations of the specifically-recognized person's face are selected for the relatively short classifier cascade.

FIG. 15 illustrates specific operations that may be used advantageously in the method of FIG. 13. At block 1502, in the classifying at block 1304, a chain of Haar and/or census features is assigned. At block 1504, in the identifying, apply approximately the same Haar and/or census features as in the classifying at block 1314.

Smile/Blink Detector Based on Face Detector Cascades

Embodiments of the invention employ in-camera training of new classifiers (i.e., instead of reusing the exact detection classifiers), that are used for separating one face from another. In certain embodiments, a binary classifier is built for faces that are and/or should be recognized. This training means that upon user request samples of the target face are acquired by employing a face detection algorithm. These samples are then used as positive samples for a binary classifier. Negative samples are either used from a small collection of generic faces and/or from other previously trained faces, which are stored locally. A relatively short classifier cascade is then trained.

In certain embodiments, the process may be repeated for faces that the user selects for future recognition. In a typical live view mode, the camera will run the tracking algorithm. A new detected face will be compared against the classifiers in the relatively short cascade in the recognition database. Depending on classifier responses and confidence accumulation, over several frames, a voting algorithm will choose one of the database faces or decide that the face does not belong to the recognition set.

In certain embodiments, information from the detection process is used to adjust the recognition process. For one such embodiment, the adjustment of the recognition process is effected dynamically based on the detector/tracker.

In accordance with various embodiments a particular face may have a number of recognition profiles, since the illumination conditions can change the classifier responses quite significantly. When a previously trained face is not correctly recognized under a certain condition, a new recognition profile can be added to that face either automatically or upon user input.

In general, certain embodiments allow the use of detection classifiers to perform recognition based on detection probability. That is, the face detector probability output is used to re-scale the classifiers for the recognizer. For one such embodiment, the detector indicates if a face is a "strong" or "weak" face and then the result is boosted or suppressed in accordance with the indication.

For certain embodiments, smile and/or blink detection works as an add-on feature to the face tracking algorithm. It will receive as input the face region in the form of a polygon such as a rectangle, or alternatively a square, rhombus, triangle, circle, or otherwise, as well as the already computed integral images and other available maps.

The smile and/or blink detection algorithm will run a binary classifier on each of the tracked face regions and will decide with a certain degree of confidence whether each of the faces is smiling or not smiling and/or blink or not blinking. If the threshold confidence level to provide an answer is not reached, the smiling or blinking state of the face will be declared as uncertain or unknown. In certain embodiments, the prerequisites for the face may be that it should be frontal, with in-plane orientation close to 0, 90 or −90. However, as described below with reference to FIGS. 16 and 17, different poses can be identified and smiling states can be determined from them.

The smile and/or blink classifier is the same type of chain with Haar and census features as the face detector. During the training part, it is learned to differentiate between positive smiling samples and negative non-smiling samples and/or blinking and non-blinking samples. The samples are face crops which are obtained by running the face detector and by automatic cropping based on manual or automatic markings on images with faces. The samples may have the same upright orientation, with slight variations.

In an alternative embodiment of the system the samples could be mouth and/or eye region crops, which hold most of the useful information for smile and/or blink classification. Such alternative system involves an additional identification of the mouth and/or eye region prior to the actual classification. This can be done by running a feature based mouth and/or eye detector, or identifying the mouth and/or eye(s) by a maximum color saturation region in the bottom half of the face or another alternative method. This general approach adds an extra level of uncertainty, but may be advantageous in utilizing less data.

The training process may provide a binary classifier chain that can decide the smiling and/or blinking state for a whole face region as it is delivered by the face detector. Smile and/or blink detection/classification may be executed on individual frames, but the logic spans over several frames as confidence is being accumulated in order to provide a consistent response for a certain face. On a particular frame in accordance with certain embodiments, the smile and/or blink classifier may run only on face rectangles (or other polygons) coming directly from the detector, because these are best centered and fitted over the face, before the tracking algorithm re-evaluates the rectangle position. The smile and/or blink classifier may also be evaluated at several slightly shifted positions around the face region.

A confidence based on these neighboring classifications is summed up and thresholded. A smiling and/or blinking decision can be positive, negative or inconclusive. The classifier evaluation is done by the same engine as the one running the face detector, but the smile and/or blink classifiers are provided instead of the face ones. During a sequence of frames, a smiling and/or blinking confidence parameter assigned to each tracked face, is either incremented or decremented for each positive or, respectively, negative smile and/or blink response. This confidence parameter may be integer, and may be bound by upper and lower limits such that the smiling decision is responsive enough, and will not lock in a certain state. The confidence parameter is updated after each smile and/or blink classification (which occurs each frame or at an interval). The final smile and/or blink state output for a face may be inquired at each frame (may be continuously output), and may be based on the sign and the absolute value of the integer confidence parameter.

In accordance with certain embodiments, an algorithm is capable of detecting smiling frontal faces, as in-camera applications. The algorithm could be viewed as a standalone feature of digital cameras for facial expression detection (e.g., smile or frown detection and/or blink or non-blink detection). Certain embodiments may also be employed in apparatuses or methods involving decisions or further actions based on the presence of a smiling and/or blinking person and may include this algorithm as a decision algorithm. In an alternative embodiment, Discreet Cosine Transforms (DCTs) are used.

The Training Part of the Algorithm

In certain embodiments, the facial expression to be detected is a smile and/or a blink. There may be two databases, one with smiles or blinks, and the other with non-smile or non-blink, grayscale images. A training algorithm is applied to each database. For one embodiment, the steps of the training algorithm may be identical or substantially the same for both databases. Crops may be used including entire faces or just mouth or eye regions or another subset at least including mouth or eye regions, as outputted from a face detector. In embodiments where blinks are being detected, then just eye region crops may be used or another subset at least including one or both eyes.

Images are read from the database (e.g., as squared crops delivered by the face detection algorithm). Then, for each image, the following steps may be performed:

1. Re-dimension the image to 25×25 pixels. This can be effected using bilinear interpolation, or alternatively bicubic splines.
2. Apply the 2DCT transform:

$$F(u, v) = C(u)C(v)\left[\sum_{x=0}^{(N-1)}\sum_{y=0}^{(N-1)} f(x, y)\cos\frac{(2_x + 1)_{u\pi}}{2_N}\cos\frac{(2_y + 1)_{v\pi}}{2_N}\right]$$

3. Set the pixels in the upper left corner of the transformed matrix (20% of the number of pixels on Ox times 20% of the number of pixels on Oy) to 0.

This corresponds to removing the low frequency coefficients which are related to person features 4. Apply the 2IDCT transform:

$$f(x, y) = \left[\sum_{u=0}^{(N-1)}\sum_{v=0}^{(N-1)} C(u)C(v)F(u, v)\cos\frac{(2_x + 1)_{u\pi}}{2_N}\cos\frac{(2_y + 1)_{v\pi}}{2_N}\right]$$

where:

-continued $$C(u) = \frac{1}{\sqrt{N}} \cdot C(v) = \frac{1}{\sqrt{N}} \text{ for } u, v = 0;$$

$$C(u) = \sqrt{\frac{2}{N}} \cdot C(v) = \sqrt{\frac{2}{N}} \text{ for } u, v = 1 \text{ through } N - 1;$$

5. Set all the negative values to 0.

This has the effect of ignoring the values outside of the value range (0 . . . 255 for gray 255; 0 . . . 1 for normalized values).

6. Apply an improved histogram equalization:

For each pixel, compute the mean of its horizontal, vertical and diagonal neighbours;

Sort pixels after their grey level, then after the computed mean;

Assign new levels of grey to each pixel;

Re-sort pixels in the original position.

The process will also work with conventional histogram equalization, though the quality of the results may be reduced.

7. Reshape the image to a vector (e.g. using vectorization).

For the whole database, after all images have been reshaped to vectors, perform the following steps:

8. Sort the vectors in 8 clusters using k-means. This is an arbitrary clustering that has been determined empirically to be sufficient to effect an advantageous concept. In general, the clustering may be different as will be appreciated by those skilled in the art.

9. Retain the cluster's centroids.

The training algorithm may be performed offline (i.e., the cluster centroids can be computed a priori and stored in a memory unit).

Figure 16:
FIG. 16 illustrates a face looking straight ahead which is classified as non-smile.
Figure 17:
FIG. 17 illustrates a face looking down which is also classified as non-smile.

FIGS. 16 and 17 illustrate a further embodiment. In both of the photos illustrated at FIGS. 16 and 17, the subject is not smiling and not blinking. In FIG. 16, the no smile, no blink state of the subject may be detected using a variety of geometrical and/or learning techniques. However, inferior techniques can tend to falsely detect the subject as smiling and/or blinking in FIG. 17, even though the subject is not smiling and not blinking. Because the subject is looking down in FIG. 17, it can appear that the subject's lips are curved upward on the outsides just like a smiling mouth would appear on a face in a frontal, non-tilted pose. The subject can also appear to be blinking or sleeping or otherwise have her eyes closed in FIG. 17, because no part of her eye balls is showing. Moreover, a subject can be looking higher than she appears to be due to her head being tilted downwards with respect to the camera. However, if the camera angle is known, then a detected apparent degree or percentage of coverage of the eyes by the eye lids can permit the system to calculate the vertical eye gaze angle and discern whether the person is looking at a computer keyboard, display screen or over them both.

Based on the triangle eyes-mouth (smoothed by the face tracking algorithm on more frames), it is determined in this embodiment whether the face orientation is in the plane (RIP) or out of the plane (ROP). Based on this information, smile/blink acceptance/rejection thresholds are adjusted dynamically in this embodiment.

The smile/blink detection threshold may be relaxed on different rotations or plane (RIP) angles, or a smile/blink detection may be applied on a precise angle (by rotating the crop image or the classifiers) and having stronger smile classifiers on 0(+/−5) degrees. Alternatively, they may be more relaxed in the training process=>0(+/−20) degrees.

A stronger smile/blink detection threshold may be placed when the faces are up-down (pitch rotation). Up-down faces can otherwise tend to lead to a large percentage of false smile/blink detections. This idea can also be applied to adjust dynamic blink (vertical gaze angle) acceptance/rejection thresholds.

Applications

As noted above, there are many applications for embodiments that detect smiles and/or blinks in digital images. Further applications are possible where two or more sensors are implemented within a digital image acquisition device. In accordance with one embodiment where at least one additional sensor is implemented in the device and that sensor faces the user, an image of the user may be acquired even as the user may be in the process of acquiring an image. Such an embodiment allows the production of an image which includes the user as well as the image acquired by the user.

When employed with facial expression detection, such an embodiment may allow the image acquisition device to initiate a preprogrammed event upon recognition or detection of a given facial expression (e.g., smile, blink, non-smile or non-blink) of the user. This allows the motion associated with typical press-button event trigger schemes to be reduced.

Similarly, embodiments can be employed to review and categorize acquired images or images as they are being acquired based upon the facial expressions of the user or a subsequent reviewer. For example, the facial expressions (indicating emotions) of the person(s) reviewing photos may be detected. If the reviewing person has a smile or blink or other state, then the image may be auto tagged. If the image gets multiple smile or blink (or non-smile or non-blink, or other facial expression) reviews over time, then that can be tallied over multiple images in a video or preview stream. The tally can provide an indication of the tendencies of the user to gaze up or down or left or right, e.g., over time.

For certain embodiments, this concept of emotion determination based upon facial expression detection is broadened as follows. Smiling, blinking and other facial expressions may be used for tagging on, personal computers, documents, videos, establishing entry points or tags of interest in video. Such PC applications could be effected for cameras mounted in the displays of personal computers for example.

In accordance with certain embodiments, data processing uses a digital processing system (DPS). The DPS may be configured to store, process, and communicate, a plurality of various types of digital information including digital images and video.

As discussed above, embodiments may employ a DPS or devices having digital processing capabilities. Exemplary components of such a system include a central processing unit (CPU), and a signal processor coupled to a main memory, static memory, and mass storage device. The main memory may store various applications to effect operations, while the mass storage device may store various digital content.

The DPS may also be coupled to input/output (I/O) devices and audio/visual devices. The CPU may be used to process information and/or signals for the processing system. The main memory may be a random access memory (RAM) or some other dynamic storage device, for storing information or instructions (program code), which are used by the CPU. The static memory may be a read only memory (ROM) and/or other static storage devices, for storing information or instructions, which may also be used by the CPU. The mass storage device may be, for example, a hard disk drive, optical disk drive, or firmware for storing information or instructions for the processing system.

Figure 18A:
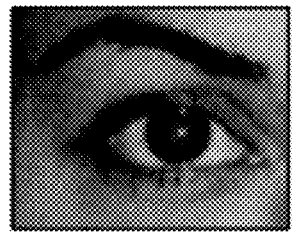
FIGS. 18a-18d show examples of common flash-induced eye defects that can occur in captured digital images.
Figure 18B:
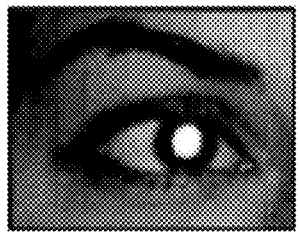
Figure 18C:
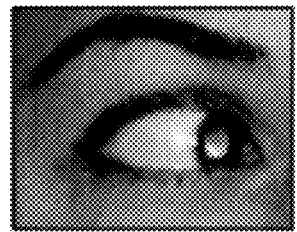
Figure 18D:

FIGS. 18a-18d show examples of common flash-induced eye defects that can occur in captured digital images. FIG. 18a shows a digital image where an eye is displaying the red-eye phenomenon. FIG. 18b shows a digital image where an eye is displaying golden-eye phenomenon. FIG. 18c shows a digital image where an eye is displaying a half-red eye phenomenon. FIG. 18d shows a digital image where one eye is displaying a red-eye phenomenon, and the other eye is displaying a golden-eye phenomenon. Aspects of the present invention relate to improving algorithms for removing these defects from captured digital images.

U.S. Pat. No. 7,352,394, filed on Feb. 4, 2004, titled "IMAGE MODIFICATION BASED ON RED-EYE FILTER ANALYSIS," discusses techniques for removing defects like those shown in FIGS. 18a-18d from digital images. In embodiments herein, the direction of horizontal eye gaze is used to determine a further action such as an action of an avatar in a gaming application or other computer event.

Techniques in accordance with certain embodiments include storing image acquisition data when an image is captured or acquired and using the image acquisition data in determining to select certain events to initiate based on the eye gaze angle. Examples of image acquisition data can include the position of the flash relative to the lens, the distance from the flash to the lens, a focal length of the lens, the distance from a point on the image acquisition device to a subject being photographed, an amount of ambient light, and flash intensity. The image acquisition data can be used in determining a course of action for how to proceed after the image is captured and the eye gaze angle is analyzed. For example, image acquisition data corresponding to a certain acquisition condition, such as large ambient light for example, might determine which subset of actions from a plurality of actions to apply to a certain gaming activity or might determine parameters to be used by a certain device routine.

Further techniques can include using image acquisition data to determine dynamic anthropometric data to determine which subset of actions from a plurality of actions to apply to a certain image or to determine parameters to be used by a certain defect correction algorithm. Further techniques can also include using image acquisition data in conjunction with dynamic anthropometric data to determine which subset of actions from a plurality of actions to apply to a certain image or to determine parameters to be used in a certain action of the device or gaming application.

FIG. 19a illustrates the normal case where the eye-gaze is directly into a lens and the flash enters the eye at a slight angle, stimulating the blood vessels of the retina, thus creating a condition that could cause a red-eye defect. FIG. 19b shows the axis of the eye aligned directly with the flash, with the subject' eye-gaze being slightly to the left (from the image acquisition device's perspective) but as the flash falls directly on the back of the retina, the flash still stimulates the retinal blood vessels potentially leading to a red-eye defect. In FIG. 19c the gaze angle extends a further few degrees to the left, and the flash is now directly incident on the blind spot region of the eye as opposed to the retinal region.

The blind spot tends to be off-axis by a number of degrees and causes a different type of defect than the retina. A more precise calculation of the relationship between the measured eye-gaze angle, the blind-spot offset, and the distance of the subject from the camera is given in FIG. 20.

The blind-spot offset is A2, which can be constant for a particular person, can be estimated based on average values. The eye-gaze angle is A1, and the distance to subject is D. The separation between flash and camera lens is S (not shown). Values for S and D can be obtained from stored image acquisition data.

$$\tan(A_1 - A_2) = \frac{S}{D}$$

and thus:

$$A_1 - A_2 = \tan^{-1}\left(\frac{S}{D}\right)$$

or the eye-gaze angle, A1, is related to S, D and A2 as:

$$A_1 = \tan^{-1}\left(\frac{S}{D}\right) + A_2$$

A table of example values for the $\tan^{-1}(S/D)$ term is given below, where the $\tan^{-1}(S/D)$ term represents the angular contribution (in degrees) of the lens-to-flash distance to the eye-gaze angle.

| D | S = 0.025 m | S = 0.05 | S = 0.075 | S = 0.15 |
|---|---|---|---|---|
| 1 meter | 1.43 | 2.86 | 4.29 | 8.53 |
| 2 meter | 0.72 | 1.43 | 2.15 | 4.29 |
| 3 meter | 0.48 | 0.95 | 1.43 | 2.86 |

By combining the image acquisition data with a measurement of eye gaze, it can be determined when to apply certain actions or trigger certain events or apply filters of a certain type. For example, if an eye gaze measurement and image acquisition data indicate that the total eye gaze is greater than a certain amount, e.g., such that yellow-eye or golden-eye occurs in an image, then a certain gaze angle range is determined and further actions can be triggered based on that eye gaze angle. Eye gaze measurements may be performed on the main acquired image, or on a sequence of preview or video images (in order to predict or refine the eye gaze measurement on the main image or a subsequent image).

Techniques in accordance with certain embodiments further include using analysis of flash-eye pairs where one eye experiences a first defect and the second eye experiences a different defect in order to determine eye gaze measurements. The reasons for this can be seen from FIG. 20 which shows that the eye gaze angles (A1 and A3) for an eye pair are somewhat different because of the distance separating the two eyes. A difference of more than 1-2 degrees in eye gaze angle can cause different forms of defects to occur in each eye of the eye-pair. By using an eye gaze measurement and image acquisition data to predict whether a pair of eyes should both experience a red-eye defect, neither experience a red-eye defect, or one experience a red-eye defect and the other experience something else, gaze angle determinations can be improved. For example, if an algorithm detects a candidate pair of eyes where both are indicative of a red-eye defect, then the eye gaze angles for both eyes can be calculated. The eye gaze determination based on eye gaze defect analysis can be used either instead of or in conjunction with other image processing techniques including other techniques mentioned in this disclosure.

Implementation Mechanisms—Hardware Overview

Figure 21:
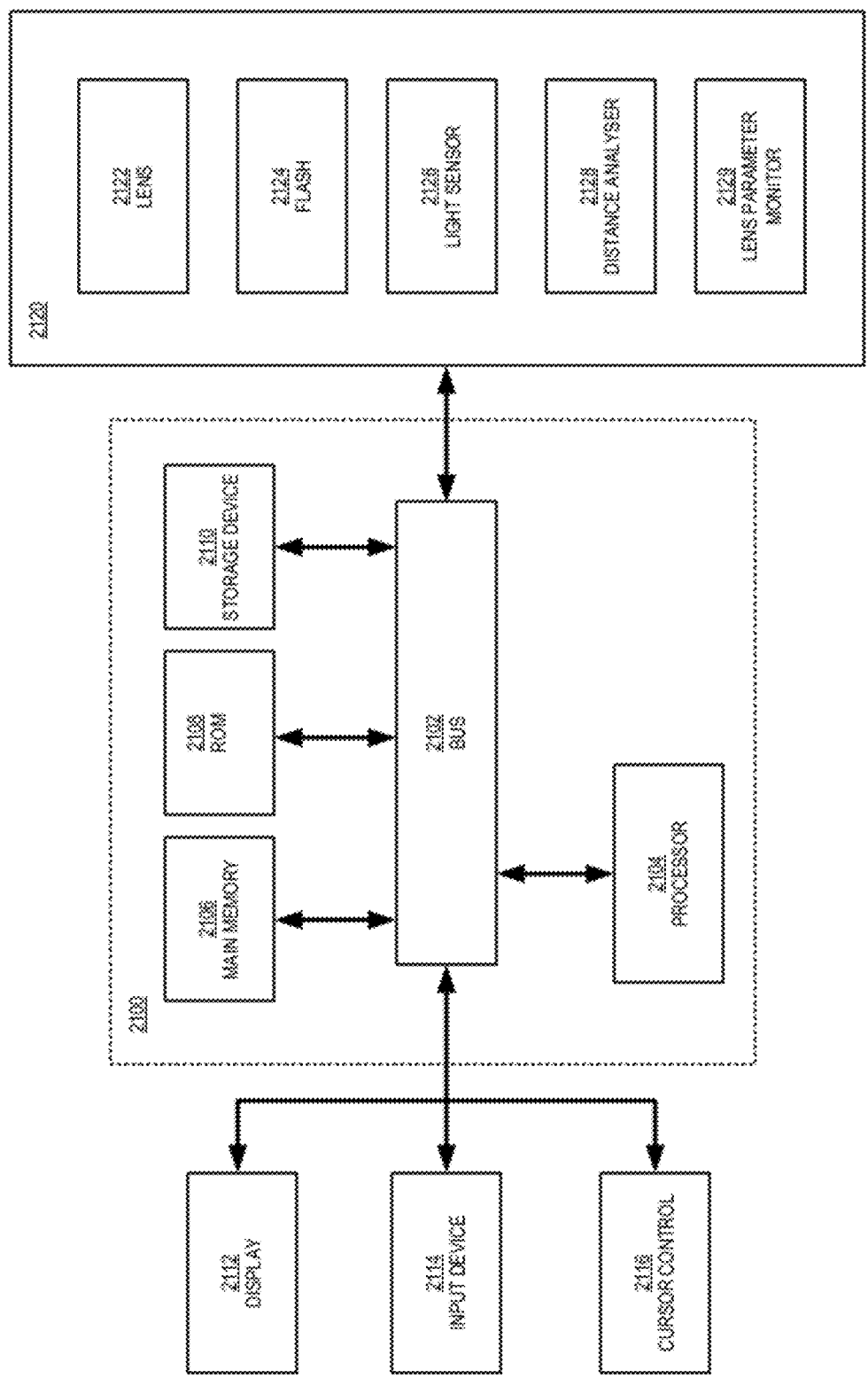
FIG. 21 is a block diagram of a portable image acquisition device.

FIG. 21 is a block diagram that illustrates an image acquisition device 2100 upon which certain embodiments may be implemented. The image acquisition device 2100 can include an image capture apparatus 2120 comprising a lens 2122 and a source of light for providing illumination during image capture 2124. The image capture apparatus 2120 can further comprise distance analyzer 2128 for determining a distance between a point on the device 2100 and a subject. The image capture apparatus 2120 can further comprise a light sensor 2126 that can be, for example a CCD, CMOS or any other object that transforms light information into electronic encoding. The image capture apparatus 2120 can further comprise a mechanism 2129 for monitoring parameters of the lens 2122 during image acquisition. Relevant parameters of the lens during acquisition can include the aperture or an f-stop, which primarily determines the depth of field, the focal length which determines the enlargement of the image, and the focusing distance which determines the distance to the objects at which the lens 2122 was focused.

The image acquisition device 2100 may be contained within a single device, such as a lens connected to a personal computer, a portable camera, a smartphone, a video camera with still image capturing capability, etc. Alternatively, various portions of the image acquisition device 2100 might be distributed between multiple devices, such as having some components on a personal computer and some components on a portable digital camera. Image acquisition device 2100 includes a bus 2102 or other communication mechanism for communicating information, and a processor 2104 coupled with bus 2102 for processing information. Image acquisition device 2100 also includes a main memory 2106, such as a random access memory ("RAM") or other dynamic storage device, coupled to bus 2102 for storing information and instructions to be executed by processor 2104. Main memory 2106 also may be used for storing temporary variables or other intermediate information during execution of instructions to be executed by processor 2104. Image acquisition device 2100 further includes a read only memory ("ROM") 2108 or other static storage device coupled to bus 2102 for storing static information and instructions for processor 2104. A storage device 2110, such as a magnetic disk or optical disk, is provided and coupled to bus 2102 for storing information and instructions.

Image acquisition device 2100 may be coupled via bus 2102 to a display 2112, such as a liquid crystal display (LCD), for displaying information or images to a user. An input device 2114, including keys, is coupled to bus 2102 for communicating information and command selections to processor 2104. Other types of user input devices, for example cursor controllers 2116 such as a mouse, trackball, stylus, or cursor direction keys for communicating direction information and command selections to processor 2104 can also be used for controlling cursor movement on display 2112 for communicating information and command selections to processor 2104.

The term "computer-readable medium" as used herein refers to any medium that participates in providing instructions to processor 2104 for execution. Such a medium may take many forms, including but not limited to non-volatile media and volatile media. Non-volatile media includes, for example, optical or magnetic disks, such as storage device 2110. Volatile media includes dynamic memory, such as main memory 2106.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read. Any single type or combination of computer-readable media can be used for storing instructions that, when executed by one or more processors, cause the processors to carry out steps corresponding to the techniques of the present invention.

Model Enhancements—Differential AAM from Real-Time Stereo Channels

Hardware Architecture of Stereo Imaging System

Figure 22:
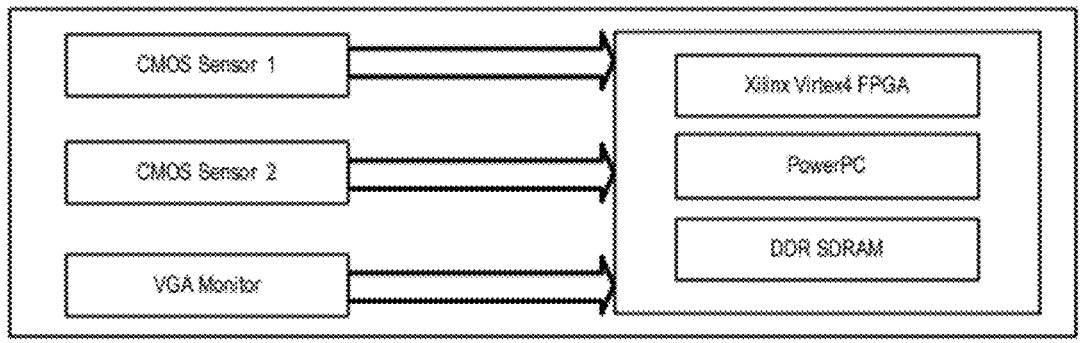
FIG. 22 illustrates a general architecture for real-time stereo video capture.

An example of a general architecture of a stereo imaging system is illustrated at FIG. 22, which shows two CMOS sensors and a VGA monitor connected to a power PC with Xilinx Virtex4 FPGA and DDR SDRAM. The two CMOS sensors are connected to an FPGA which incorporates a PowerPC core and associated SDRAM. Additional system components can be added to implement a dual stereo image processing pipeline (see, e.g., I. Andorko and P. Corcoran, "FPGA Based Stereo Imaging System with Applications in Computer Gaming", at International IEEE Consumer Electronics Society's Games Innovations Conference 2009 (ICE-GIC 09), London, UK, incorporated by reference).

Figure 23:
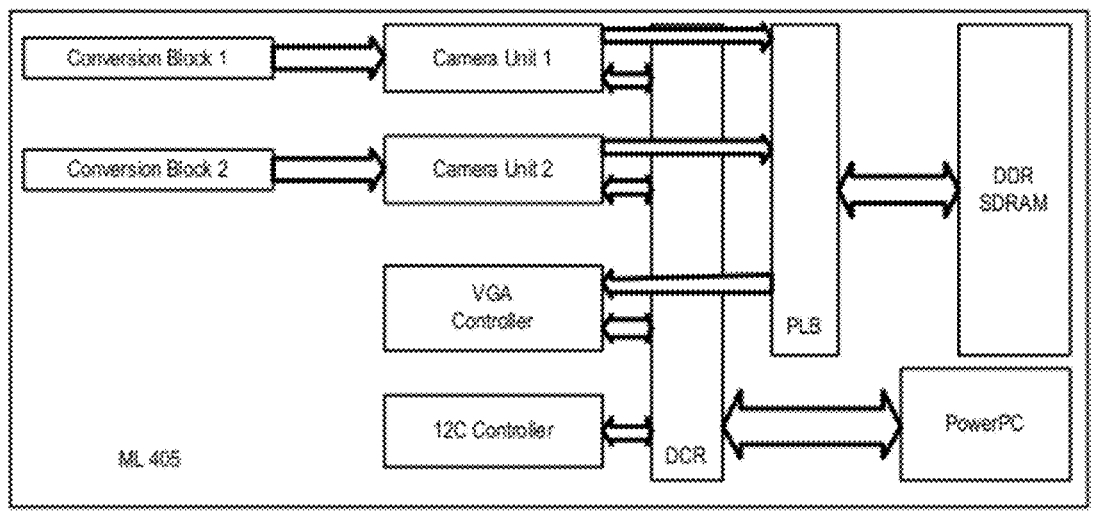
FIG. 23 illustrates an internal architecture for real-time stereo video capture.
Figure 24:
FIG. 24 illustrates a stereo face image pair example.

The development board is a Xilinx ML405 development board, with a Virtex 4 FPGA, a 64 MB DDR SDRAM memory, and a PowerPC RISC processor. The clock frequency of the system is 100 MHz. An example internal architecture of the system in accordance with certain embodiments is illustrated at FIG. 23 which shows two conversion blocks respectively coupled to camera units 1 and 2. The camera units 1 and 2 feed a PLB that feeds a VGA controller. A DCR is connected to the camera units 1 and 2, the VGA controller, an I2C controller and a Power PC. The PLB is also coupled with DDR SDRAM. The sensor used in this embodiment includes a ⅓ inch SXGA CMOS sensor made by Micron. It has an active zone of 1280×1024 pixels. It is programmable through the I2C interface. It works at 13.9 fps and the clock frequency is 25 MHz. This sensor was selected because of its small size, low cost and the specifications of these sensors are satisfactory for this project. This system enables real-time stereo video capture with a fixed distance between the two imaging sensors. FIG. 24 illustrates a stereo face image pair example.

Determination of a Depth Map

When using two sensors for stereo imaging, the problem of parallax effect appears. Parallax is an apparent displacement or difference of orientation of an object viewed along two different lines of sight, and is measured by the angle or semi-angle of inclination between those two lines.

Figure 25:
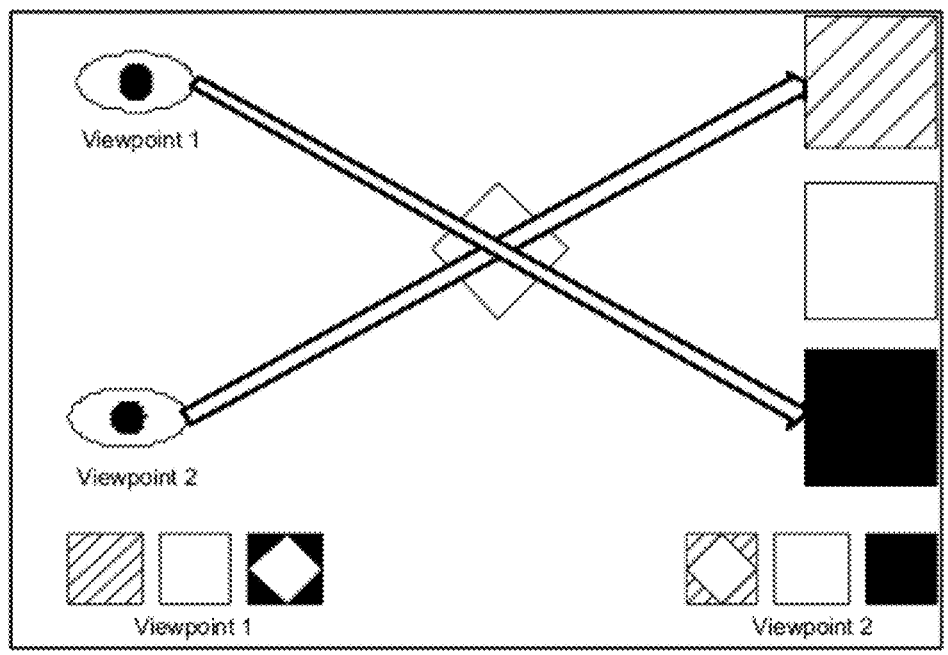
FIG. 25 illustrates the Parallax Effect.

The advantage of the parallax effect is that with the help of this, depth maps can be computed. The computation in certain embodiments involves use of pairs of rectified images (see, K. Muhlmann, D. Maier, J. Hesser, R. Manner, "Calculating Dense Disparity Maps from Color Stereo Images, an Efficient Implementation", International Journal of Computer Vision, vol. 47, numbers 1-3, pp. 79-88, April 2002, incorporated by reference). This means that corresponding epipolar lines are horizontal and on the same height. The search of corresponding pictures takes place in horizontal direction only in certain embodiments. For every pixel in the left image, the goal is to find the corresponding pixel in the right image, or vice-versa. FIG. 25 illustrates the parallax effect.

It is difficult or at least computationally expensive to find corresponding single pixels, and so windows of different sizes (3×3; 5×5; 7×7) may be used. The size of window is computed based on the value of the local variation of each pixel (see C. Georgoulas, L. Kotoulas, G. Ch. Sirakoulis, I. Andreadis, A. Gasteratos, "Real-Time Disparity Map Computation Module", Microprocessors and Microsystems 32, pp. 159-170, 2008, incorporated by reference). A formula that may be used for the computation of the local variation per Georgoulas et al. is shown below n equation 6:

$$LV(p) = \sum_{i=1}^{N} \sum_{j=1}^{N} |I(i,j) - \mu| \quad (6)$$

where $\mu$ is the average grayscale value of image window, and N is the selected square window size.

Figure 26:
FIG. 26 illustrates a depth map result for the stereo image pair of FIG. 24.

The first local variation calculation may be made over a 3×3 window. After this, the points with a value under a certain threshold are marked for further processing. The same operation is done for 5×5 and 7×7 windows as well. The sizes of the windows is stored for use in the depth map computation. The operation to compute the depth map is the Sum of Absolute Differences for RGB images (SAD). The value of SAD is computed for up to a maximum value of d on the x line. After all the SAD values have been computed, the minimum value of SAD(x,y,d) is chosen, and the value of d from this minimum will be the value of the pixel in the depth map. At searching the minimum, there are some problems that we should be aware of. If the minimum is not unique, or its position is $d_{min}$ or $d_{max}$, the value is discarded. Instead of just seeking the minimum, it is helpful to track the three smallest SAD values as well. The minimum defines a threshold above which the third smallest value must lie. Otherwise, the value is discarded. FIG. 26 illustrates a depth map result for the stereo image pair illustrated in FIG. 24.

One of the conditions for a depth map computation technique to work properly is that the stereo image pairs should contain strong contrast between the colors within the image and there should not be large areas of nearly uniform color. Other researchers who attempted the implementation of this algorithm used computer generated stereo image pairs which contained multiple colors (see Georgoulas et al. and L. Di Stefano, M. Marchionni, and S. Mattoccia, "A Fast Area-Based Stereo Matching Algorithm", Image and Vision Computing, pp. 983-1005, 2004, which are incorporated by reference). In some cases, the results after applying the algorithm for faces can be sub-optimal, because the color of facial skin is uniform across most of the face region and the algorithm may not be able to find exactly similar pixels in the stereo image pair.

AAM Enhanced Shape Model

A face model may involve two, orthogonal texture spaces. The development of a dual orthogonal shape subspace is described below which may be derived from the difference and averaged values of the landmark points derived from the right-hand and left hand stereo face images. This separation provides us with an improved 2D registration estimate from the averaged landmark point locations and an orthogonal subspace derived from the different values.

Figure 27:
FIG. 27 illustrates a fitted AAM face model on the stereo pair of FIG. 24.
Figure 28:
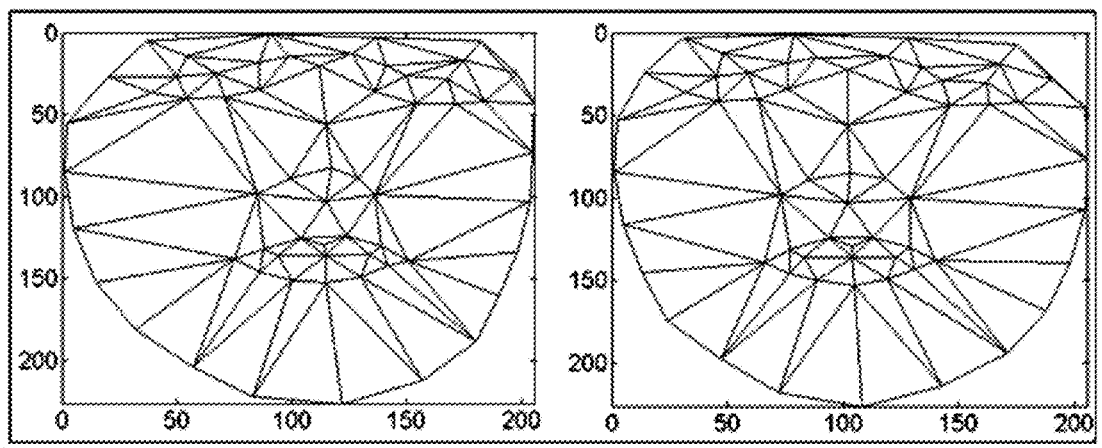
FIG. 28 illustrates corresponding triangulated meshes for a fitted model.
Figure 29:
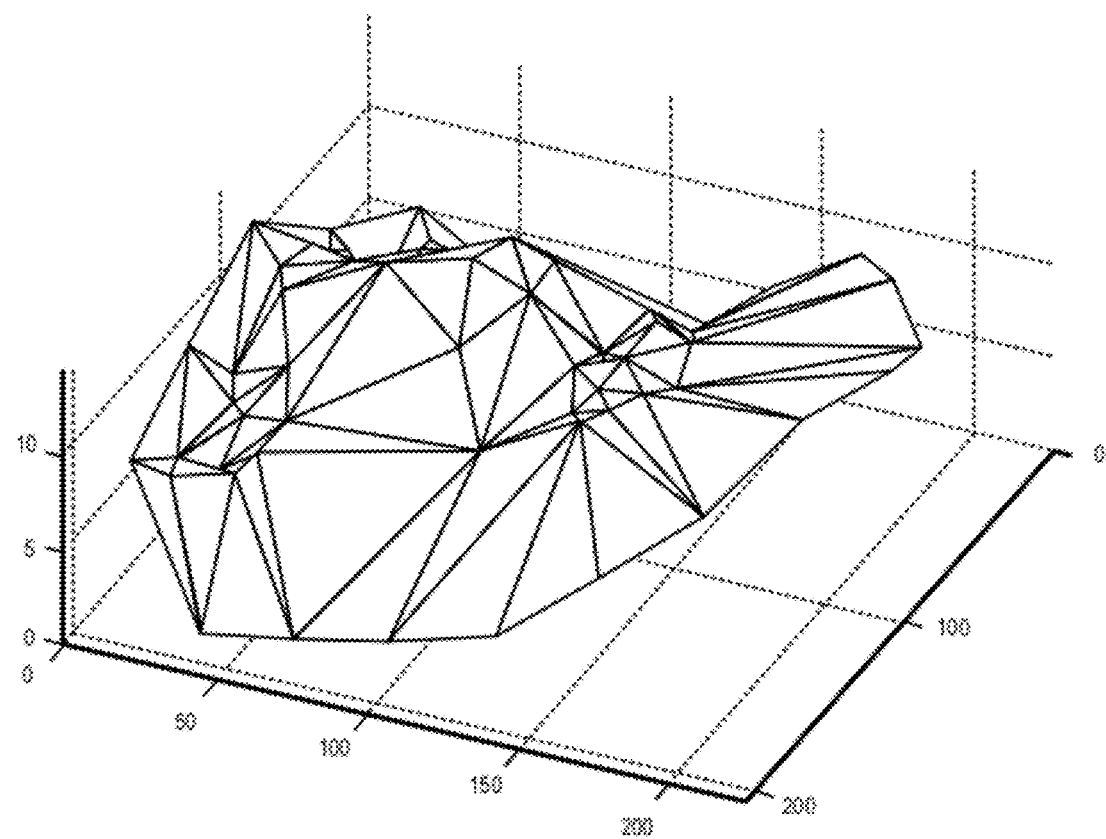
FIG. 29 illustrates generating a 3D shape from 2D stereo data with triangulation-based warping.

This second subspace enables an improved determination of the SAD values and the estimation of an enhanced 3D surface view over the face region. FIG. 27 illustrates a fitted AAM face model on the stereo pair of FIG. 24, and represents an example of fitting the model on the stereo image pair, and illustrates identified positions of considered facial landmarks. Examples of corresponding triangulated shapes are illustrated in FIG. 28. The landmarks are used as control points for generating the 3D shape, based on their relative 2D displacement in the two images. The result is illustrated at FIG. 29 as corresponding triangulated meshes for the fitted model of FIG. 27.

The 3D shape model allows for 3D constraints to be imposed, making the face model more robust to pose variations; it also reduces the possibility of generating unnatural shape instances during the fitting process, subsequently reducing the risk of an erroneous convergence. Examples of efficient fitting algorithms for the new, so called 2D+3D, model are described at J. Xiao, S. Baker, I. Matthews, and T. Kanade, "Real-Time Combined 2D+3D Active Appearance Models," in Proceedings of the IEEE Conference on Computer Vision and Pattern Recognition (CVPR '04), pp. 535-542, 2004; C. Hu, J. Xiao, I. Matthews, S. Baker, J. Cohn, and T. Kanade, "Fitting a single active appearance model simultaneously to multiple images," in Proc. of the British Machine Vision Conference, September 2004; and S. C. Koterba, S. Baker, I. Matthews, C. Hu, J. Xiao, J. Cohn, and T. Kanade, "Multi-View AAM Fitting and Camera Calibration," in Proc. International Conference on Computer Vision, October, 2005, pp. 511-518, which are each incorporated by reference.

Examples of full 3D face models, called 3D morphable models (3DMM), are described at V. Blanz and T. Vetter, "A morphable model for the synthesis of 3D faces," in Proceedings of the 26th annual conference on Computer graphics and interactive techniques, pp. 187-194, 1999, incorporated by reference. Yet, these models have a high complexity and significant computational requirements, thus in certain embodiments the approaches based on the simpler AAM techniques are alternatively used, particularly for implementation in embedded systems. FIG. 29 illustrates a 3D shape generated from 2D stereo data with triangulation-based warping.

General Matters

Embodiments provide methods and apparatuses for detecting and determining facial expressions such as smiles and blinks in digital images.

Embodiments have been described as including various operations. Many of the processes are described in their most basic form, but operations can be added to or deleted from any of the processes without departing from the scope of the invention.

The operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection). All operations may be performed at the same central site or, alternatively, one or more operations may be performed elsewhere.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein, as well as the background, invention summary, abstract and brief description of the drawings, are all incorporated by reference into the detailed description of the preferred embodiments as disclosing alternative embodiments.

What is claimed is:

1. A method for detecting a vertical gaze direction of a face within a digital image, the method comprising performing, by a computing device, the steps of:
   acquiring a digital image including at least part of a face including one or both eyes;
   analyzing at least one of the eyes for which at least a portion of an eye ball is visible within the digital image,
   wherein analyzing the at least one of the eyes includes determining whether the eye ball is covered by an eye lid within the digital image by more than a threshold degree;
   based, at least in part, on whether the eye ball is covered by the eye lid by more than the threshold degree, determining an approximate direction of vertical eye gaze by the at least one of the eyes; and
   initiating a further action based on the determined approximate direction of vertical eye gaze,
   wherein the method is performed by one or more computing devices.

2. The method of claim 1, further comprising determining that the at least one of the eyes is looking at a particular display screen of multiple display screens, including concluding that the determined approximate direction of vertical eye gaze lies within a directional range of said particular display screen.

3. The method of claim 1, wherein the initiating a further action comprises controlling an avatar of a gaming application.

4. The method of claim 1, wherein the analyzing at least one of the eyes comprises determining an approximate direction of horizontal gaze, and wherein said initiating a further action or initiating a different action, or both, are based at least in part on the determined approximate direction of horizontal gaze.

5. The method of claim 4, wherein the analyzing at least one of the eyes comprises spectrally analyzing a reflection of light from the at least one of the eyes.

6. The method of claim 4, wherein the analyzing at least one of the eyes comprises analyzing an amount of sclera visible on at least one side of the iris.

7. The method of claim 1, further comprising determining an angular offset of the face from normal, and determining said approximate direction of vertical eye gaze based in part on the angular offset and in part on the degree of coverage of the eye ball by the eye lid.

8. The method of claim 1, wherein when the determined approximate direction of vertical gaze is determined not to lie within a directional range of a digital device, then the further action comprises a power save routine of the digital device.

9. The method of claim 8, wherein when the determined approximate direction of vertical gaze is determined to lie within a directional range of a digital device, then the further action comprises a power on launch routine of the digital device.

10. The method of claim 1 wherein determining whether the eye ball is covered by the eye lid includes determining a degree of coverage of the eye ball by the eye lid.

11. The method of claim 10, further comprising:
    determining that the at least one of the eyes is looking at a particular display screen of multiple display screens, wherein the multiple display screens comprise a top screen and a bottom screen;
    concluding that the approximate direction lies within the directional range of the bottom screen when determined degree of coverage exceeds the threshold degree; and
    concluding that the approximate direction lies within the directional range of the top screen when the determined degree of coverage is less than the threshold degree.

12. The method of claim 1 wherein determining whether the eye ball is covered by the eye lid includes determining a percentage of coverage of an iris of the eye ball by the eye lid.

13. An image acquisition device, comprising:
    a lens and image sensor for acquiring digital images;
    a processor;
    a memory having embedded therein code to program the processor to perform a method of detecting a vertical gaze direction of a face within a digital image, wherein the method comprises:
    acquiring a digital image including at least part of a face including one or both eyes;
    analyzing at least one of the eyes for which at least a portion of an eye ball is visible within the digital image,
    wherein analyzing the at least one of the eyes includes determining whether the eye ball is covered by an eye lid within the digital image by more than a threshold degree;
    based, at least in part, on whether the eye ball is covered by the eye lid by more than a threshold degree, determining an approximate direction of vertical eye gaze by the at least one of the eyes; and
    initiating a further action based on the determined approximate direction of vertical eye gaze.

14. The device of claim 13, wherein the method further comprises determining that the at least one of the eyes is looking at a particular display screen of multiple display screens, including concluding that the determined approximate direction of vertical eye gaze lies within a directional range of said particular display screen.

15. The device of claim 13, wherein the initiating a further action comprises controlling an avatar of a gaming application.

16. The device of claim 13, wherein the analyzing at least one of the eyes comprises determining an approximate direction of horizontal gaze, and wherein said initiating a further action or initiating a different action, or both, are based at least in part on the determined approximate direction of horizontal gaze.

17. The device of claim 16, wherein the analyzing at least one of the eyes comprises spectrally analyzing a reflection of light from the at least one of the eyes.

18. The device of claim 16, wherein the analyzing at least one of the eyes comprises analyzing an amount of sclera visible on at least one side of the iris.

19. The device of claim 13, wherein the method further comprises determining an angular offset of the face from normal, and determining said approximate direction of vertical eye gaze based in part on the angular offset and in part on the degree of coverage of the eye ball by the eye lid.

20. The device of claim 13, wherein when the determined approximate direction of vertical gaze is determined not to lie within a directional range of a digital device, then the further action comprises a power save routine of the digital device.

21. The device of claim 20, wherein when the determined approximate direction of vertical gaze is determined to lie within a directional range of a digital device, then the further action comprises a power on launch routine of the digital device.

22. The device of claim 13, wherein determining whether the eye ball is covered by the eye lid includes determining a degree of coverage of the eye ball by the eye lid.

23. The device of claim 22, the method further comprising:
  determining that the at least one of the eyes is looking at a particular display screen of multiple display screens, wherein the multiple display screens comprise a top screen and a bottom screen; and
  concluding that the approximate direction lies within the directional range of the bottom screen when determined degree of coverage exceeds the threshold degree; and
  concluding that the approximate direction lies within the directional range of the top screen when the determined degree of coverage is less than the threshold degree.

24. The device of claim 13, wherein determining whether the eye ball is covered by the eye lid includes determining a percentage of coverage of an iris of the eye ball by the eye lid.

25. One or more non-transitory processor-readable media having code embedded therein for programming a processor to perform a method of detecting a vertical gaze direction of a face within a digital image, wherein the method comprises:
  acquiring a digital image including at least part of a face including one or both eyes;
  analyzing at least one of the eyes for which at least a portion of an eye ball is visible within the digital image,
  wherein analyzing the at least one of the eyes includes determining whether the eye ball is covered by an eye lid within the digital image by more than a threshold degree;
  based, at least in part, on whether the eye ball is covered by the eye lid by more than the threshold degree, determining an approximate direction of vertical eye gaze by the at least one of the eyes; and
  initiating a further action based on the determined approximate direction of vertical eye gaze.

26. The one or more non-transitory processor-readable media of claim 25, wherein the method further comprises determining that the at least one of the eyes is looking at a particular display screen of multiple display screens, including concluding that the determined approximate direction of vertical eye gaze lies within a directional range of said particular display screen.

27. The one or more non-transitory processor-readable media of claim 25, wherein the initiating a further action comprises controlling an avatar of a gaming application.

28. The one or more non-transitory processor-readable media of claim 25, wherein the analyzing at least one of the eyes comprises determining an approximate direction of horizontal gaze, and wherein said initiating a further action or initiating a different action, or both, are based at least in part on the determined approximate direction of horizontal gaze.

29. The one or more non-transitory processor-readable media of claim 28, wherein the analyzing at least one of the eyes comprises spectrally analyzing a reflection of light from the at least one of the eyes.

30. The one or more non-transitory processor-readable media of claim 28, wherein the analyzing at least one of the eyes comprises analyzing an amount of sclera visible on at least one side of the iris.

31. The one or more non-transitory processor-readable media of claim 28, wherein the method further comprises determining an angular offset of the face from normal, and determining said approximate direction of vertical eye gaze based in part on the angular offset and in part on the degree of coverage of the eye ball by the eye lid.

32. The one or more non-transitory processor-readable media of claim 25, wherein when the determined approximate direction of vertical gaze is determined not to lie within a directional range of a digital device, then the further action comprises a power save routine of the digital device.

33. The one or more non-transitory processor-readable media of claim 32, wherein when the determined approximate direction of vertical gaze is determined to lie within a directional range of a digital device, then the further action comprises a power on launch routine of the digital device.

34. The one or more non-transitory processor-readable media of claim 25, wherein determining whether the eye ball is covered by the eye lid includes determining a degree of coverage of the eye ball by the eye lid.

35. The one or more non-transitory processor-readable media of claim 34, the method further comprising:
  determining that the at least one of the eyes is looking at a particular display screen of multiple display screens, wherein the multiple display screens comprise a top screen and a bottom screen;
  concluding that the approximate direction lies within the directional range of the bottom screen when determined degree of coverage exceeds the threshold degree; and
  concluding that the approximate direction lies within the directional range of the top screen when the determined degree of coverage is less than the threshold degree.

36. The one or more non-transitory processor-readable media of claim 25, wherein determining whether the eye ball is covered by the eye lid includes determining a percentage of coverage of an iris of the eye ball by the eye lid.

* * * * *